United States Patent
Sun et al.

(10) Patent No.: US 12,181,640 B2
(45) Date of Patent: Dec. 31, 2024

(54) CAMERA OPTICAL LENS

(71) Applicant: AAC Optics (Suzhou) Co., Ltd., Suzhou (CN)

(72) Inventors: Wen Sun, Shenzhen (CN); Jia Chen, Shenzhen (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 516 days.

(21) Appl. No.: 17/544,809

(22) Filed: Dec. 7, 2021

(65) Prior Publication Data

US 2023/0087761 A1 Mar. 23, 2023

(30) Foreign Application Priority Data

Sep. 23, 2021 (CN) .......................... 202111112929.X

(51) Int. Cl.
  *G02B 13/00* (2006.01)
  *G02B 9/64* (2006.01)

(52) U.S. Cl.
  CPC .......... *G02B 13/0045* (2013.01); *G02B 9/64* (2013.01)

(58) Field of Classification Search
  CPC ...... G02B 13/0045; G02B 9/64; G02B 13/04; G02B 30/00
  USPC ....................................................... 359/708
  See application file for complete search history.

(56) References Cited

U.S. PATENT DOCUMENTS

| | | | | |
|---|---|---|---|---|
| 2019/0056568 A1* | 2/2019 | Huang | ................ | G02B 9/64 |
| 2019/0235196 A1* | 8/2019 | Hong | ................ | G02B 7/028 |
| 2021/0063697 A1* | 3/2021 | Li | ................ | G02B 9/64 |
| 2022/0137368 A1* | 5/2022 | Zhao | ................ | G02B 13/0045 |
| | | | | 359/708 |
| 2022/0179172 A1* | 6/2022 | Lai | ................ | G02B 27/0025 |
| 2022/0221693 A1* | 7/2022 | Niu | ................ | G02B 9/64 |
| 2022/0317418 A1* | 10/2022 | Cheng | ................ | G02B 27/0018 |
| 2023/0068322 A1* | 3/2023 | Lee | ................ | G02B 13/0045 |

* cited by examiner

*Primary Examiner* — Stephone B Allen
*Assistant Examiner* — Boutsikaris Leonidas
(74) *Attorney, Agent, or Firm* — W&G Law Group

(57) ABSTRACT

The present invention discloses a camera optical lens including, from an object side to an image side in sequence, a first lens having a positive refractive power, a second lens having a negative refractive power, a third lens having a positive refractive power, a fourth lens having a refractive power, a fifth lens having a refractive power, a sixth lens having a refractive power, a seventh lens having a positive refractive power, and an eighth lens having a negative refractive power. The camera optical lens satisfies the following conditions: $0.85 \leq f1/f \leq 1.10$, $1.00 \leq d6/d8 \leq 3.00$, $3.00 \leq (R11+R12)/(R11-R12) \leq 20.00$, and $d15\ max/d15\ min \leq 2.20$. The camera optical lens according to the present invention has excellent optical characteristics, such as large aperture, wide angle, and ultra-thin.

11 Claims, 15 Drawing Sheets

CAMERA OPTICAL LENS

FIELD OF THE PRESENT INVENTION

The present invention relates to the field of optical lens, and more particularly, to a camera optical lens suitable for handheld terminal devices, such as smart phones and digital cameras, and imaging devices, such as monitors or PC lenses.

DESCRIPTION OF RELATED ART

In recent years, with the rise of various smart devices, the demand for miniaturized camera optics has been increasing, and the pixel size of photosensitive devices has shrunk, coupled with the development trend of electronic products with good functions, thin and portable appearance. Therefore, miniaturized imaging optical lenses with good image quality have become the mainstream in the current market. In order to obtain better imaging quality, a multi-piece lens structure is often used. Moreover, with the development of technology and the increase of diversified needs of users, as the pixel area of the photosensitive device continues to shrink and the system's requirements for image quality continue to increase, the eight-element lenses structure gradually appears in the lens design. There is an urgent need for a wide-angle imaging lens with excellent optical characteristics, small size, and fully corrected aberrations.

SUMMARY

In the present invention, a cameral optical lens has excellent optical characteristics with large aperture, ultra-thin and wide angle.

According to one aspect of the present invention, a camera optical lens comprises, from an object side to an image side in sequence, a first lens having a positive refractive power, a second lens having a negative refractive power, a third lens having a positive refractive power, a fourth lens having a refractive power, a fifth lens having a refractive power, a sixth lens having a refractive power, a seventh lens having a positive refractive power, and an eighth lens having a negative refractive power. The camera optical lens satisfies the following conditions: $0.85 \leq f1/f \leq 1.10$, $1.00 \leq d6/d8 \leq 3.00$, $3.00 \leq (R11+R12)/(R11-R12) \leq 20.00$, and $d15 \max/d15 \min \leq 2.20$. f denotes a focal length of the camera optical lens, f1 denotes a focal length of the first lens, d6 denotes an on-axis distance from an image side surface of the third lens to an object side surface of the fourth lens, d8 denotes an on-axis distance from an image side surface of the fourth lens to an object side surface of the fifth lens, R11 denotes a central curvature radius of an object side surface of the sixth lens, R12 denotes a central curvature radius of an image side surface of the sixth lens, d15 max denotes a maximum thickness of the eighth lens parallel to an optical axis, and d15 min denotes a minimum thickness of the eighth lens parallel to the optical axis.

As an improvement, the camera optical lens further satisfies the following conditions: $3.00 \leq R10/R9 \leq 20.00$. R9 denotes a central curvature radius of the object side surface of the fifth lens, and R10 denotes a central curvature radius of an image side surface of the fifth lens.

As an improvement, the camera optical lens further satisfies the following condition: $1.00 \leq d14/d15 \leq 2.50$. d14 denotes an on-axis distance from an image side surface of the seventh lens to an object side surface of the eighth lens, and d15 denotes an on-axis thickness of the eighth lens.

As an improvement, the first lens has an object side surface being convex in a paraxial region and an image side surface being concave in the paraxial region. The camera optical lens further satisfies the following conditions: $-4.14 \leq (R1+R2)/(R1-R2) \leq -1.05$, and $0.05 \leq d1/TTL \leq 0.17$. R1 denotes a central curvature radius of the object side surface of the first lens, R2 denotes a central curvature radius of the image side surface of the first lens, d1 denotes an on-axis thickness of the first lens, and TTL denotes a total optical length from the object side surface of the first lens of the camera optical lens to an image surface of the camera optical lens along the optical axis.

As an improvement, the second lens has an object side surface being convex in a paraxial region and an image side surface being concave in the paraxial region. The camera optical lens further satisfies the following conditions: $-5.44 \leq f2/f \leq -1.32$, $1.81 \leq (R3+R4)/(R3-R4) \leq 8.00$, and $0.01 \leq d3/TTL \leq 0.0$. f2 denotes a focal length of the second lens, R3 denotes a central curvature radius of the object side surface of the second lens, R4 denotes a central curvature radius of the image side surface of the second lens, d3 denotes an on-axis thickness of the second lens, and TTL denotes a total optical length from an object side surface of the first lens of the camera optical lens to an image surface of the camera optical lens along the optical axis.

As an improvement, the third lens has an object side surface being convex in a paraxial region and the image side surface of the third lens is concave in the paraxial region. The camera optical lens further satisfies the following conditions: $1.78 \leq f3/f \leq 8.62$, $-9.26 \leq (R5+R6)/(R5-R6) \leq -2.10$, and $0.02 \leq d5/TTL \leq 0.08$. f3 denotes a focal length of the third lens, R5 denotes a central curvature radius of the object side surface of the third lens, R6 denotes a central curvature radius of the image side surface of the third lens, d5 denotes an on-axis thickness of the third lens, and TTL denotes a total optical length from an object side surface of the first lens of the camera optical lens to an image surface of the camera optical lens along the optical axis.

As an improvement, the object side surface of the fourth lens is concave in a paraxial region and the image side surface of the fourth lens is convex in the paraxial region. The camera optical lens further satisfies the following conditions: $f4/f \leq 15.72$, $-233.20 \leq (R7+R8)/(R7-R8) \leq 8.51$, and $0.02 \leq d7/TTL \leq 0.09$. f4 denotes a focal length of the fourth lens, d7 denotes an on-axis thickness of the fourth lens, R7 denotes a central curvature radius of the object side surface of the fourth lens, and R8 denotes a central curvature radius of the image side surface of the fourth lens, and TTL denotes a total optical length from an object side surface of a first lens of the camera optical lens to an image surface of the camera optical lens along the optical axis.

As an improvement, the camera optical lens further satisfies the following conditions: $-8.72 \leq f5/f \leq 187.14$, and $0.02 \leq d9/TTL \leq 0.06$. f5 denotes a focal length of the fifth lens, d9 denotes an on-axis thickness of the fifth lens, and TTL denotes a total optical length from an object side surface of a first lens of the camera optical lens to an image surface of the camera optical lens along the optical axis.

As an improvement, the camera optical lens further satisfies the following conditions: $-141.15 \leq f6/f \leq -61.51$, and $0.02 \leq d11/TTL \leq 0.09$. f6 denotes a focal length of the sixth lens, d11 denotes an on-axis thickness of the sixth lens, and TTL denotes a total optical length from an object side surface of a first lens of the camera optical lens to an image surface of the camera optical lens along the optical axis.

As an improvement, the seventh lens has an object side surface being convex in a paraxial region and an image side surface being concave in the paraxial region. The camera optical lens further satisfies the following conditions: $0.88 \leq f7/f \leq 3.67$, $-25.59 \leq (R13+R14)/(R13-R14) \leq -3.95$, and $0.03 \leq d13/TTL \leq 0.13$. f7 denotes a focal length of the seventh lens, d13 denotes an on-axis thickness of the seventh lens, R13 denotes a central curvature radius of the object side surface of the seventh lens, R14 denotes a central curvature radius of the image side surface of the seventh lens, and TTL denotes a total optical length from an object side surface of a first lens of the camera optical lens to an image surface of the camera optical lens along the optical axis.

As an improvement, the eighth lens has an object side surface being concave in a paraxial region and an image side surface being concave in the paraxial region. The camera optical lens further satisfies the following conditions: $-1.98 \leq f8/f \leq -0.61$, $0.14 \leq (R15+R16)/(R15-R16) \leq 0.85$, and $0.04 \leq d15/TTL \leq 0.19$. f8 denotes a focal length of the eighth lens, d15 denotes an on-axis thickness of the eighth lens, R15 denotes a central curvature radius of the object side surface of the eighth lens, R16 denotes a central curvature radius of the image side surface of the eighth lens, and TTL denotes a total optical length from an object side surface of a first lens of the camera optical lens to an image surface of the camera optical lens along the optical axis.

BRIEF DESCRIPTION OF THE DRAWINGS

In order to explain the technical solutions in the embodiments of the present invention more clearly, the following will briefly introduce the drawings that need to be used in the description of the embodiments. Obviously, the drawings in the following description are only some embodiments of the present invention. For those of ordinary skill in the art, without creative work, other drawings can be obtained based on these drawings, among which.

DETAILED DESCRIPTION OF THE EXEMPLARY EMBODIMENTS

In order to make the objects, technical solutions, and advantages of the present invention more apparent, the embodiments of the present invention will be described in detail below. However, it will be apparent to the one skilled in the art that, in the various embodiments of the present invention, a number of technical details are presented in order to provide the reader with a better understanding of the invention. However, the technical solutions claimed in the present invention can be implemented without these technical details and various changes and modifications based on the following embodiments.

Embodiment 1

Figure 1:
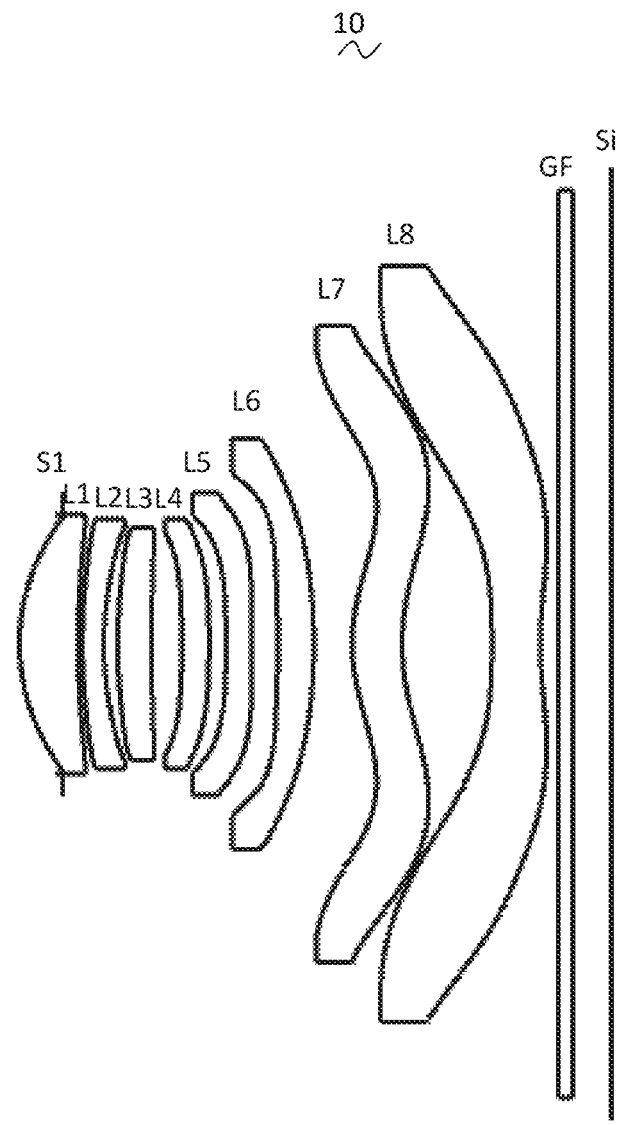
FIG. 1 is a schematic diagram of a structure of a camera optical lens in accordance with Embodiment 1 of the present invention.

As referring to the accompanying drawings, the present invention provides a camera optical lens 10. FIG. 1 shows the camera optical lens 10 according to embodiment 1 of the present invention. The camera optical lens 10 comprises eight lenses. Specifically, from an object side to an image side, the camera optical lens 10 comprises in sequence: an aperture S1, a first lens L1, a second lens L2, a third lens L3, a fourth lens L4, a fifth lens L5, a sixth lens L6, a seventh lens L7 and an eighth lens L8. Optical elements like optical filter GF can be arranged between the eighth lens L8 and an image surface Si.

The first lens L1 is made of plastic material, the second lens L2 is made of plastic material, the third lens L3 is made of plastic material, the fourth lens L4 is made of plastic material, the fifth lens L5 is made of plastic material, the sixth lens L6 is made of plastic material, the seventh lens L7 is made of plastic material, and the eighth lens L8 is made of plastic material. In other optional embodiments, each lens may also be made of other materials.

A focal length of the camera optical lens 10 is defined as f. A focal length of the first lens L1 is defined as f1. The camera optical lens 10 further satisfies the following condition: $0.85 \leq f1/f \leq 1.10$, which specifies a ratio of the focal length f1 of the first lens L1 to the focal length f of the camera optical lens 10. When the above condition is satisfied, an amount of the field curvature of the camera optical lens 10 can be effectively balanced so that an offset amount of the field curvature of a center field lower than 0.01 mm.

An on-axis distance from an image side surface of the third lens L3 to an object side surface of the fourth lens L4 is defined as d6. An on-axis distance from an image side surface of the fourth lens L4 to an object side surface of the fifth lens L5 is defined as d8. The camera optical lens 10 further satisfies the following condition: $1.00 \leq d6/d8 \leq 3.00$, which specifies a ratio of the on-axis distance from an image side surface of the third lens L3 to an object side surface of the fourth lens L4 to the on-axis distance from an image side surface of the fourth lens L4 to an object side surface of the fifth lens L5. When the value is within this range, it benefits for reducing a total optical length, thereby realizing an ultra-thin effect.

A central curvature radius of an object side surface of the sixth lens L6 is defined as R12, and a central curvature radius of an image side surface of the sixth lens L6 is defined as R12. The camera optical lens 10 further satisfies the following condition: $3.00 \leq (R11+R12)/(R11-R12) \leq 20.00$, which specifies a shape of the sixth lens L6. When the value is within this range, it is beneficial for correcting astigmatism and distortion of the camera optical lens so that |Distortion|≤2.5%, and so that the brightness or saturation can be maintained, with the focal length reasonable distributed.

A maximum thickness of the eighth lens parallel to an optical axis is defined as d15 max; and a minimum thickness of the eighth lens parallel to the optical axis is defined as d15 min. When the above condition is satisfied, it is beneficial for molding and assembling the lenses.

A central curvature radius of an object side surface of the fifth lens L5 is defined as R9, and a central curvature radius of an image side surface of the fifth lens L5 is defined as R10. The camera optical lens further satisfies the following condition: $3.00 \leq R10/R9 \leq 20.00$, which specifies a shape of the fifth lens L5, thereby reducing a deflection of light and effectively correct a chromatism, so that the chromatism |LC|≤1.5 μm.

An on-axis distance from an image side surface of the seventh lens L7 to an object side surface of the eighth lens L8 is defined as d14. An on-axis thickness of the eighth lens L8 is defined as d5. The camera optical lens 10 further satisfies the following condition: $1.00 \leq d14/d15 \leq 2.50$, which specifies a ratio of the on-axis distance from an image side surface of the seventh lens L7 to an object side surface of the eighth lens L8 to the on-axis thickness of the eighth lens L8. When the value is within this range, it benefits for reducing the total optical length, thereby realizing the ultra-thin effect.

In the present embodiment, an object side surface of the first lens L1 is convex in a paraxial region and an image side surface of the first lens L1 is concave in the paraxial region. The first lens L1 has a positive refractive power. In other optional embodiments, the object side surface and the image side surface of the first lens L1 can also be set to other concave and convex distribution situations.

A central curvature radius of the object side surface of the first lens L1 is defined as R1, and a central curvature radius of the image side surface of the first lens L1 is defined as R2. The camera optical lens 10 further satisfies the following condition: $-4.14 \leq (R1+R2)/(R1-R2) \leq -1.05$. This condition reasonably controls a shape of the first lens L1, so that the first lens L1 can effectively correct a spherical aberration of the camera optical lens 10. Preferably, the following condition shall be satisfied, $-2.59 \leq (R1+R2)/(R1-R2) \leq -1.31$.

An on-axis thickness of the first lens L1 is defined as d1. The total optical length from the object side surface of the first lens L1 to the image surface Si of the camera optical lens 10 along an optical axis is defined as TTL. The camera optical lens 10 further satisfies the following condition: $0.05 \leq d1/TTL \leq 0.17$. When the value is within this range, it benefits for realizing the ultra-thin effect. Preferably, the following condition shall be satisfied, $0.07 \leq d1/TTL \leq 0.14$.

In the present embodiment, an object side surface of the second lens L2 is convex in the paraxial region and an image side surface of the second lens L2 is concave in the paraxial region. The second lens L2 has a negative refractive power. In other optional embodiments, the object side surface and the image side surface of the second lens L2 can also be set to other concave and convex distribution situations.

The focal length of the camera optical lens 10 is defined as f, and a focal length of the second lens L2 is defined as f2. The camera optical lens 10 further satisfies the following condition: $-5.448 \leq f2/f \leq -1.32$. By a reasonable distribution of the positive refractive power, which makes it is possible that the camera optical lens 10 has an excellent imaging quality and a lower sensitivity. Preferably, the following condition shall be satisfied, $-3.40 \leq f2/f \leq -1.66$.

A central curvature radius of the object side surface of the second lens L2 is defined as R3, and a central curvature radius of the image side surface of the second lens L2 is defined as R4. The camera optical lens 10 further satisfies the following condition: $1.81 \leq (R3+R4)/(R3-R4) \leq 8.00$, which specifies a shape of the second lens L2. When the value is within this range, as the camera optical lens 10 develops toward ultra-thin and wide-angle, it is beneficial to correct the problem of an on-axis chromatic aberration. Preferably, the following condition shall be satisfied, $2.89 \leq (R3+R4)/(R3-R4) \leq 6.40$.

An on-axis thickness of the second lens L2 is defined as d3. The total optical length from the object side surface of the first lens L1 to the image surface Si of the camera optical lens 10 along the optical axis is defined as TTL. The camera optical lens 10 further satisfies the following condition: $0.01 \leq d3/TTL \leq 0.05$. When the value is within this range, it benefits for realizing the ultra-thin effect. Preferably, the following condition shall be satisfied, $0.02 \leq d3/TTL \leq 0.04$.

In the present embodiment, an object side surface of the third lens L3 is concave in the paraxial region and the image side surface of the third lens L3 is concave in the paraxial region. The third lens L3 has a positive refractive power. In other optional embodiments, the object side surface and the image side surface of the third lens L3 can also be set to other concave and convex distribution situations.

The focal length of the camera optical lens 10 is defined as f, and a focal length of the third lens L3 is defined as f3. The camera optical lens 10 further satisfies the following condition: $1.78 \leq f3/f \leq 8.62$. By a reasonable distribution of the refractive power, which makes it is possible that the camera optical lens 10 has the excellent imaging quality and the lower sensitivity. Preferably, the following condition shall be satisfied, $2.85 \leq f3/f \leq 6.89$.

A central curvature radius of the object side surface of the third lens L3 is defined as R5, and a central curvature radius of the image side surface of the third lens L3 is defined as R6. The camera optical lens 10 further satisfies the following condition: $-9.26 \leq (R5+R6)/(R5-R6) \leq -2.10$, which specifies a shape of the third lens 13. It benefits for molding of the third lens L3. When the value is within this range, a degree of deflection of light passing through the lens can be alleviated, and aberrations can be reduced effectively. Preferably, the following condition shall be satisfied, $-5.78 \leq (R5+R6)/(R5-R6) \leq -2.63$.

An on-axis thickness of the third lens L3 is defined as d5. The total optical length from the object side surface of the first lens L1 to the image surface Si of the camera optical lens 10 along the optical axis is defined as TTL. The camera optical lens 10 further satisfies the following condition: $0.02 \leq d5/TTL \leq 0.08$, which benefits for realizing the ultra-thin effect. Preferably, the following condition shall be satisfied, $0.03 \leq d5/TTL \leq 0.07$.

In the present embodiment, the object side surface of the fourth lens L4 is concave in the paraxial region and the image side surface of the fourth lens L4 is convex in the paraxial region. The fourth lens L4 has a positive refractive power. In other optional embodiments, the object side surface and the image side surface of the fourth lens L4 can also be set to other concave and convex distribution situations. The fourth lens L4 may have a negative refractive power.

The focal length of the camera optical lens 10 is defined as f, and a focal length of the fourth lens L4 is defined as f4. The camera optical lens 10 further satisfies the following condition: f4/f≤15.72. By a reasonable distribution of the refractive power, which makes it is possible that the camera optical lens 10 has the excellent imaging quality and the lower sensitivity. Preferably, the following condition shall be satisfied, f4/f≤12.57.

The curvature radius of the object side surface of the fourth lens L4 is defined as R7, and the central curvature radius of the image side surface of the fourth lens L4 is defined as R8. The camera optical lens further satisfies the following condition: −233.20≤(R7+R8)/(R7−R8)≤8.51, which specifies a shape of the fourth lens L4. When the value is within this range, as the development of ultra-thin and wide-angle lenses, it benefits for solving the problems, such as correcting an off-axis aberration. Preferably, the following condition shall be satisfied, −145.75≤(R7+R8)/(R7−R8)≤6.81.

An on-axis thickness of the fourth lens L4 is defined as d7. The total optical length from the object side surface of the first lens L1 to the image surface Si of the camera optical lens 10 along the optical axis is defined as TTL. The camera optical lens 10 further satisfies the following condition: 0.02≤d7/TTL≤0.09, which benefits for realizing the ultra-thin effect. Preferably, the following condition shall be satisfied, 0.04≤d7/TTL≤0.08.

In the present embodiment, the object side surface of the fifth lens L5 is concave in the paraxial region and an image side surface of the fifth lens L5 is convex in the paraxial region. The fifth lens L5 has a negative refractive power. In other optional embodiments, the object side surface and the image side surface of the fifth lens L5 can also be set to other concave and convex distribution situations.

The focal length of the camera optical lens 10 is defined as f, and a focal length of the fifth lens L5 is defined as f5. The camera optical lens 10 further satisfies the following condition: −8.72≤f5/f≤187.14, when the value is within this range, a light angle of the camera optical lens 10 can be smoothed effectively and the sensitivity of the tolerance can be reduced. Preferably, the following condition shall be satisfied, −5.45≤f5/f≤149.71.

An on-axis thickness of the fifth lens L5 is defined as d9. The total optical length from the object side surface of the first lens L1 to the image surface Si of the camera optical lens 10 along the optical axis is defined as TTL. The camera optical lens 10 further satisfies the following condition: 0.02≤d9/TTL≤0.06. When the value is within this range, it benefits for realizing the ultra-thin effect. Preferably, the following condition shall be satisfied, 0.03≤d9/TTL≤0.05.

In the present embodiment, the object side surface of the sixth lens L6 is concave in the paraxial region and the image side surface of the sixth lens L6 is convex in the paraxial region. The sixth lens L6 has a positive refractive power. In other optional embodiments, the object side surface and the image side surface of the sixth lens L6 can also be set to other concave and convex distribution situations. The sixth lens L6 may have a negative refractive power.

The focal length of the camera optical lens 10 is defined as f, and a focal length of the sixth lens L6 is defined as f6. The camera optical lens 10 further satisfies the following condition: −141.15≤f6/f≤61.51. By a reasonable distribution of the refractive power, which makes it is possible that the camera optical lens 10 has the excellent imaging quality and the lower sensitivity. Preferably, the following condition shall be satisfied, −88.22≤f6/f≤49.21.

An on-axis thickness of the sixth lens L6 is defined as d11. The total optical length from the object side surface of the first lens L1 to the image surface Si of the camera optical lens 10 along the optical axis is defined as TTL. The camera optical lens 10 further satisfies the following condition: 0.02≤d11/TTL≤0.09, which benefits for realizing the ultra-thin effect. Preferably, the following condition shall be satisfied, 0.03≤d11/TTL≤0.07.

In the present embodiment, an object side surface of the seventh lens L7 is convex in the paraxial region and an image side surface of the seventh lens L7 is concave in the paraxial region. The seventh lens L7 has a positive refractive power. In other optional embodiments, the object side surface and the image side surface of the seventh lens L7 can also be set to other concave and convex distribution situations.

The focal length of the camera optical lens 10 is defined as f, and a focal length of the seventh lens L7 is defined as f7. The camera optical lens 10 further satisfies the following condition: 0.88≤f7/f≤3.67. By a reasonable distribution of the refractive power, which makes it is possible that the camera optical lens 10 has the excellent imaging quality and the lower sensitivity. Preferably, the following condition shall be satisfied, 1.40≤f7/f≤2.94.

The curvature radius of the object side surface of the seventh lens L7 is defined as R13, and the central curvature radius of the image side surface of the seventh lens L7 is defined as R14. The camera optical lens further satisfies the following condition: −25.59≤(R13+R14)/(R13−R14)≤−3.95, which specifies a shape of the seventh lens L7. When the value is within this range, as the development of the ultra-thin and wide-angle lenses, it benefits for solving the problems, such as correcting the off-axis aberration. Preferably, the following condition shall be satisfied, −16.00≤(R13+R14)/(R13−R14)≤−4.93.

An on-axis thickness of the seventh lens L7 is defined as d13. The total optical length from the object side surface of the first lens L1 to the image surface Si of the camera optical lens 10 along the optical axis is defined as TTL. The camera optical lens 10 further satisfies the following condition: 0.03≤d13/TTL≤0.13, which benefits for realizing the ultra-thin effect. Preferably, the following condition shall be satisfied, 0.06≤d13/TTL≤0.10.

In the present embodiment, an object side surface of the eighth lens L8 is concave in the paraxial region and an image side surface of the eighth lens L8 is concave in the paraxial region. The eighth lens L8 has a negative refractive power. In other optional embodiments, the object side surface and the image side surface of the eighth lens L8 can also be set to other concave and convex distribution situations.

The focal length of the camera optical lens 10 is defined as f, and a focal length of the eighth lens L8 is defined as f8. The camera optical lens 10 further satisfies the following condition: −1.98≤f8/f≤−0.61. By a reasonable distribution of the refractive power, which makes it is possible that the camera optical lens 10 has the excellent imaging quality and the lower sensitivity. Preferably, the following condition shall be satisfied, −1.24≤f8/f≤−0.76.

A central curvature radius of the object side surface of the eighth lens L8 is defined as R15, and a central curvature radius of the image side surface of the eighth lens L8 is defined as R16. The camera optical lens further satisfies the following condition: 0.14≤(R15+R16)/(R15−R16)≤0.85, which specifies a shape of the eighth lens L8. When the value is within this range, as the development of the ultra-thin and wide-angle lenses, it benefits for solving the problems, such as correcting the off-axis aberration. Preferably, the following condition shall be satisfied, $0.23 \leq (R15+R16)/(R15-R16) \leq 0.68$.

An on-axis thickness of the eighth lens L8 is defined as d15. The total optical length from the object side surface of the first lens L1 to the image surface Si of the camera optical lens 10 along the optical axis is defined as TTL. The camera optical lens 10 further satisfies the following condition: $0.04 \leq d15/TTL \leq 0.19$, which benefits for realizing the ultra-thin effect. Preferably, the following condition shall be satisfied, $0.06 \leq d15/TTL \leq 0.15$.

In the present embodiment, an image height of the camera optical lens 10 is defined as IH. The total optical length from the object side surface of the first lens L1 to the image surface Si of the camera optical lens 10 along an optical axis is defined as TTL. The camera optical lens 10 further satisfies the following condition: $TTL/IH \leq 1.30$, thereby achieving the ultra-thin performance. Preferably, the following condition shall be satisfied, $TTL/IH \leq 1.25$.

In the present embodiment, a field of view of the camera optical lens 10 in a diagonal direction is defined as FOV. The FOV is greater than or equal to 83.00°, thereby achieving the wide-angle performance. Preferably, the FOV is greater than or equal to 85.00°.

In the present embodiment, an F number (FNO) of the camera optical lens 10 is smaller than or equal to 2.03, thereby achieving a large aperture and good imaging performance. Preferably, the FNO of the camera optical lens 10 is smaller than or equal to 2.00.

When satisfying above conditions, which makes it is possible that the camera optical lens has excellent optical performances, and meanwhile can meet design requirements of an ultra-thin, wide-angle lenses having large aperture. According the characteristics of the camera optical lens 10, it is particularly suitable for a mobile camera lens component and a WEB camera lens composed of high pixel CCD, CMOS.

The following examples will be used to describe the camera optical lens 10 of the present invention. The symbols recorded in each example will be described as follows. The focal length, on-axis distance, central curvature radius, on-axis thickness, inflexion point position, and arrest point position are all in units of mm.

TTL: the total optical length from the object side surface of the first lens L1 to the image surface Si of the camera optical lens 10 along the optical axis, the unit of TTL is mm.

F number (FNO): the ratio of an effective focal length of the camera optical lens 10 to an entrance pupil diameter (ENPD).

Preferably, inflexion points and/or arrest points can also be arranged on the object side surface and/or image side surface of the lens, so that the demand for high quality imaging can be satisfied, the description below can be referred for specific implementable scheme.

The design information of the camera optical lens 10 in Embodiment 1 of the present invention is shown in the tables 1 and 2.

TABLE 1

|  | R | d |  | nd | vd |  |
|---|---|---|---|---|---|---|
| S1 | ∞ | d0 = | −0.658 |  |  |  |
| R1 | 3.014 | d1 = | 0.879 | nd1 | 1.5444 | v1 55.82 |
| R2 | 10.187 | d2 = | 0.066 |  |  |  |

TABLE 1-continued

|  | R | d |  | nd | vd |  |
|---|---|---|---|---|---|---|
| R3 | 7.596 | d3 = | 0.321 | nd2 | 1.6610 | v2 20.53 |
| R4 | 4.728 | d4 = | 0.212 |  |  |  |
| R5 | 7.968 | d5 = | 0.500 | nd3 | 1.5444 | v3 55.82 |
| R6 | 15.361 | d6 = | 0.454 |  |  |  |
| R7 | −21.567 | d7 = | 0.413 | nd4 | 1.5444 | v4 55.82 |
| R8 | −14.520 | d8 = | 0.255 |  |  |  |
| R9 | −19.613 | d9 = | 0.384 | nd5 | 1.6700 | v5 19.39 |
| R10 | −155.433 | d10 = | 0.394 |  |  |  |
| R11 | −12.000 | d11 = | 0.538 | nd6 | 1.5876 | v6 29.04 |
| R12 | −10.439 | d12 = | 0.578 |  |  |  |
| R13 | 2.69 | d13 = | 0.748 | nd7 | 1.5444 | v7 55.82 |
| R14 | 3.521 | d14 = | 1.343 |  |  |  |
| R15 | −17.997 | d15 = | 0.724 | nd8 | 1.5346 | v8 55.69 |
| R16 | 4.991 | d16 = | 0.273 |  |  |  |
| R17 | ∞ | d17 = | 0.210 | ndg | 1.5168 | vg 64.17 |
| R18 | ∞ | d18 = | 0.587 |  |  |  | where, the meaning of the various symbols is as follows.

S1: aperture;

R: curvature radius of an optical surface, a central curvature radius for a lens;

R1: central curvature radius of the object side surface of the first lens L1;

R2: central curvature radius of the image side surface of the first lens L1;

R3: central curvature radius of the object side surface of the second lens L2;

R4: central curvature radius of the image side surface of the second lens L2;

R5: central curvature radius of the object side surface of the third lens L3;

R6: central curvature radius of the image side surface of the third lens L3;

R7: central curvature radius of the object side surface of the fourth lens L4;

R8: central curvature radius of the image side surface of the fourth lens L4;

R9: central curvature radius of the object side surface of the fifth lens L5;

R10: central curvature radius of the image side surface of the fifth lens L5;

R11: central curvature radius of the object side surface of the sixth lens L6;

R12: central curvature radius of the image side surface of the sixth lens L6;

R13: central curvature radius of the object side surface of the seventh lens L7;

R14: central curvature radius of the image side surface of the seventh lens L7;

R15: central curvature radius of the object side surface of the eighth lens L8;

R16: central curvature radius of the image side surface of the eighth lens L8;

R17: central curvature radius of an object side surface of the optical filter GF;

R18: curvature radius of an image side surface of the optical filter GF;

d: on-axis thickness of a lens and an on-axis distance between lenses;

d0 on-axis distance from the aperture S1 to the object side surface of the first lens L1;

d1 on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the seventh lens L7;
d13: on-axis thickness of the fifth lens L7;
d14: on-axis distance from the image side surface of the seventh lens L7 to the object side surface of the eighth lens L8;
d15: on-axis thickness of the eighth lens L8;
d16: on-axis distance from the image side surface of the eighth lens L8 to the object side surface of the optical filter GF;
d17: on-axis thickness of the optical filter GF;
d18: on-axis distance from the image side surface of the optical filter GF to the image surface;
nd: refractive index of d line (d-line is green light with a wavelength of 550 nm);
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
nd8: refractive index of d line of the eighth lens L8;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
v8: abbe number of the eighth lens L8;
vg: abbe number of the optical filter GF;

Table 2 shows the aspherical surface data of the camera optical lens 10 in Embodiment 1 of the present invention.

TABLE 2

| | Conic coefficient | Aspheric surface coefficients | | | | |
|---|---|---|---|---|---|---|
| | k | A4 | A6 | A8 | A10 | A12 |
| R1 | −3.2983E−01 | 1.4657E−03 | −2.2624E−03 | 5.3511E−03 | −6.1015E−03 | 3.9265E−03 |
| R2 | −9.4876E+00 | −1.1757E−02 | 1.4557E−02 | −1.9022E−02 | 1.6148E−02 | −8.7591E−03 |
| R3 | −7.3355E+00 | −1.7066E−02 | 2.4286E−02 | −3.5495E−02 | 3.3717E−02 | −2.0115E−02 |
| R4 | −9.8555E+00 | 1.1966E−04 | 1.8999E−02 | −4.4078E−02 | 5.4889E−02 | −4.1604E−02 |
| R5 | 1.5725E+00 | −4.7382E−03 | 1.3787E−03 | −7.0010E−03 | 1.1268E−02 | −1.0320E−02 |
| R6 | 1.5084E+01 | −8.5545E−03 | 3.9242E−03 | −7.3221E−03 | 7.4532E−03 | −4.9669E−03 |
| R7 | 2.3446E+01 | −1.8959E−02 | 6.8180E−04 | 8.2073E−04 | −2.9747E−03 | 1.4634E−03 |
| R8 | −2.9441E+00 | −1.4543E−02 | −1.7853E−02 | 3.0167E−02 | −2.8585E−02 | 1.6859E−02 |
| R9 | −2.3155E+01 | −1.3682E−03 | −5.5479E−02 | 6.2785E−02 | −4.5043E−02 | 2.1764E−02 |
| R10 | 4.1944E+01 | 1.6598E−02 | −4.7380E−02 | 3.6972E−02 | −1.9643E−02 | 7.1615E−03 |
| R11 | −3.1602E+01 | 2.3209E−02 | −1.4081E−02 | 4.3638E−03 | −1.2156E−03 | 2.4024E−04 |
| R12 | −1.9272E+01 | −1.8192E−02 | 7.1687E−03 | −1.9456E−03 | 2.5539E−04 | −5.4455E−06 |
| R13 | −5.8472E+00 | −1.5388E−03 | −3.7039E−03 | 6.1727E−04 | −5.6335E−05 | 2.9285E−06 |
| R14 | −3.3938E+00 | 8.3684E−04 | −4.4424E−03 | 9.6718E−04 | −1.2446E−04 | 1.0173E−05 |
| R15 | −2.9524E+01 | −3.2362E−02 | 6.3968E−03 | −8.3425E−04 | 7.5447E−05 | −4.5351E−06 |
| R16 | −1.5124E+01 | −2.2225E−02 | 3.5226E−03 | −4.4664E−04 | 4.2010E−05 | −2.6487E−06 |

| | Conic coefficient | Aspheric surface coefficients | | | |
|---|---|---|---|---|---|
| | k | A14 | A16 | A18 | A20 |
| R1 | −3.2983E−01 | −1.5230E−03 | 3.5196E−04 | −4.4799E−05 | 2.4190E−06 |
| R2 | −9.4876E+00 | 3.0728E−03 | −6.7606E−04 | 8.4499E−05 | −4.5459E−06 |
| R3 | −7.3355E+00 | 7.6700E−03 | −1.8144E−03 | 2.4198E−04 | −1.3842E−05 |
| R4 | −9.8555E+00 | 1.9754E−02 | −5.7208E−03 | 9.2351E−04 | −6.3522E−05 |
| R5 | 1.5725E+00 | 5.8315E−03 | −1.9591E−03 | 3.6069E−04 | −2.7812E−05 |
| R6 | 1.5084E+01 | 2.2319E−03 | −6.2784E−04 | 9.6351E−05 | −5.6295E−06 |
| R7 | 2.3446E+01 | 1.8253E−04 | −3.7633E−04 | 1.1544E−04 | −1.1030E−05 |
| R8 | −2.9441E+00 | −6.2570E−03 | 1.4051E−03 | −1.7470E−04 | 9.4683E−06 |
| R9 | −2.3155E+01 | −6.9314E−03 | 1.3679E−03 | −1.5147E−04 | 7.2664E−06 |
| R10 | 4.1944E+01 | −1.7378E−03 | 2.6398E−04 | −2.2612E−05 | 8.4365E−07 |
| R11 | −3.1602E+01 | −2.9048E−05 | 1.6606E−06 | −3.4641E−08 | 2.2106E−09 |
| R12 | −1.9272E+01 | −2.7151E−06 | 3.6112E−07 | −1.9219E−08 | 3.7396E−10 |
| R13 | −5.8472E+00 | −2.5150E−08 | −5.8781E−09 | 2.9165E−10 | −4.3379E−12 |
| R14 | −3.3938E+00 | −5.1936E−07 | 1.5862E−08 | −2.6221E−10 | 1.7787E−12 |
| R15 | −2.9524E+01 | 1.7627E−07 | −4.2581E−09 | 5.8304E−11 | −3.4733E−13 |
| R16 | −1.5124E+01 | 1.0616E−07 | −2.5867E−09 | 3.5008E−11 | −2.0244E−13 |

For convenience, an aspheric surface of each lens surface uses the aspheric surfaces shown in the below condition (1). However, the present invention is not limited to the aspherical polynomials form shown in the condition (1).

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20} \quad (1)$$

Where, K is a conic coefficient, A4, A6, A8, A10, A12, A14, A16, A18, A20 are aspheric surface coefficients. c is the curvature at the center of the optical surface. r is a vertical distance between a point on an aspherical curve and the optic axis, and z is an aspherical depth (a vertical distance between a point on an aspherical surface, having a distance of r from the optic axis, and a surface tangent to a vertex of the aspherical surface on the optic axis).

Table 3 and Table 4 show design data of inflexion points and arrest points of respective lens in the camera optical lens 10 according to Embodiment 1 of the present invention. P1R1 and P1R2 represent the object side surface and the image side surface of the first lens L1, P2R1 and P2R2 represent the object side surface and the image side surface of the second lens L2, P3R1 and P3R2 represent the object side surface and the image side surface of the third lens L3, P4R1 and P4R2 represent the object side surface and the image side surface of the fourth lens L4, P5R1 and P5R2 represent the object side surface and the image side surface of the fifth lens L5, P6R1 and P6R2 represent the object side surface and the image side surface of the sixth lens L6, P7R1 and P7R2 represent the object side surface and the image side surface of the seventh lens L7, and P8R1 and P8R2 represent the object side surface and the image side surface of the eighth lens L8. The data in the column named "inflexion point position" refers to vertical distances from inflexion points arranged on each lens surface to the optical axis of the camera optical lens 10. The data in the column named "arrest point position" refers to vertical distances from arrest points arranged on each lens surface to the optical axis of the camera optical lens 10.

TABLE 3

| | Number of inflexion points | Inflexion point position 1 | Inflexion point position 2 | Inflexion point position 3 |
|---|---|---|---|---|
| P1R1 | 1 | 1.935 | / | / |
| P1R2 | 0 | / | / | / |
| P2R1 | 0 | / | / | / |
| P2R2 | 0 | / | / | / |
| P3R1 | 0 | / | / | / |
| P3R2 | 2 | 0.865 | 1.445 | / |
| P4R1 | 1 | 1.645 | / | / |
| P4R2 | 1 | 1.735 | / | / |
| P5R1 | 0 | / | / | / |
| P5R2 | 3 | 0.225 | 0.355 | 2.105 |
| P6R1 | 1 | 2.465 | / | / |
| P6R2 | 0 | / | / | / |
| P7R1 | 2 | 1.135 | 3.285 | / |
| P7R2 | 2 | 1.325 | 4.145 | / |
| P8R1 | 2 | 2.895 | 5.205 | / |
| P8R2 | 3 | 0.785 | 4.935 | 5.535 |

TABLE 4

| | Number of arrest points | Arrest point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |
| P7R1 | 1 | 2.065 |
| P7R2 | 1 | 2.375 |
| P8R1 | 0 | / |
| P8R2 | 1 | 1.555 |
| P9R1 | 0 | / |
| P9R2 | 0 | / |

Figure 2:
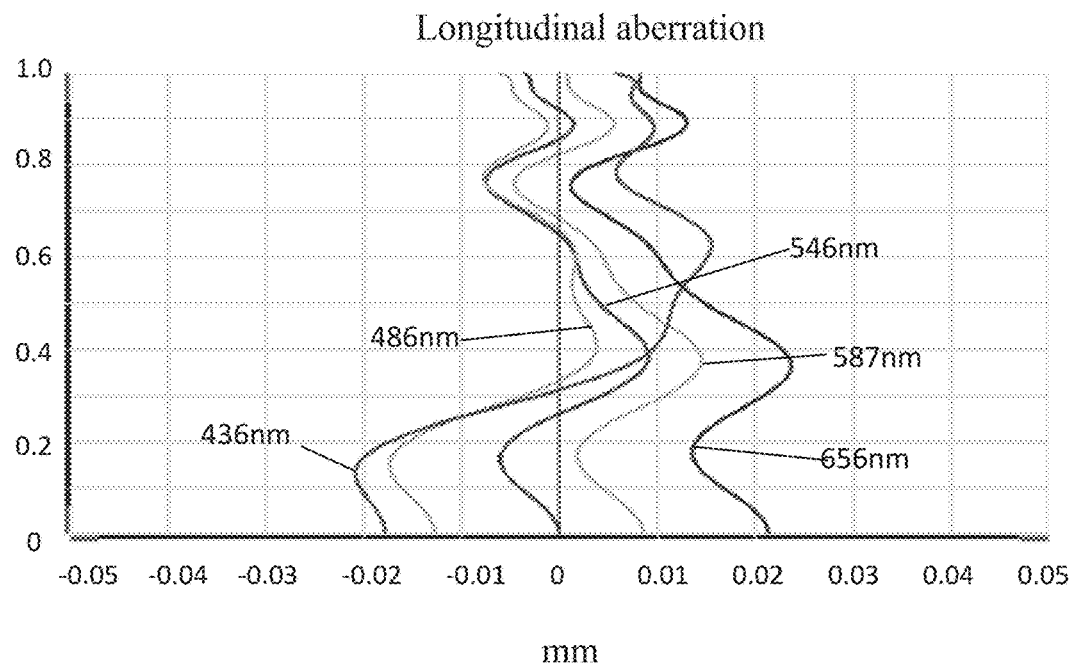
FIG. 2 is a schematic diagram of a longitudinal aberration of the camera optical lens shown in FIG. 1.
Figure 3:
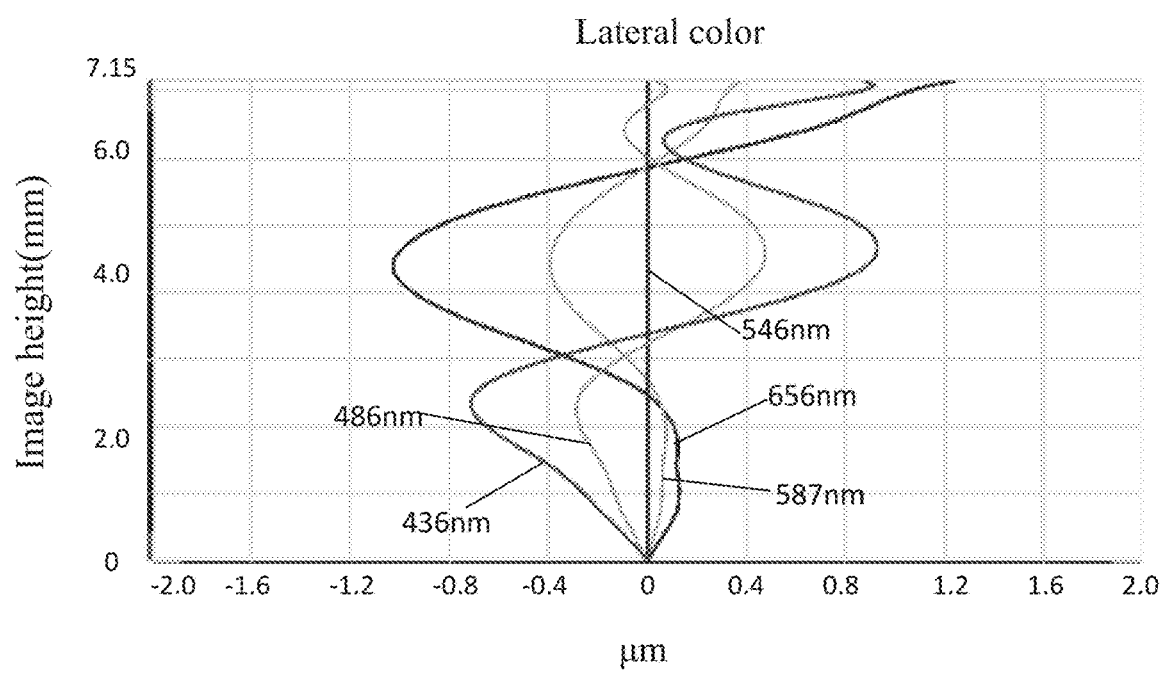
FIG. 3 is a schematic diagram of a lateral color of the camera optical lens shown in FIG. 1.
Figure 4:
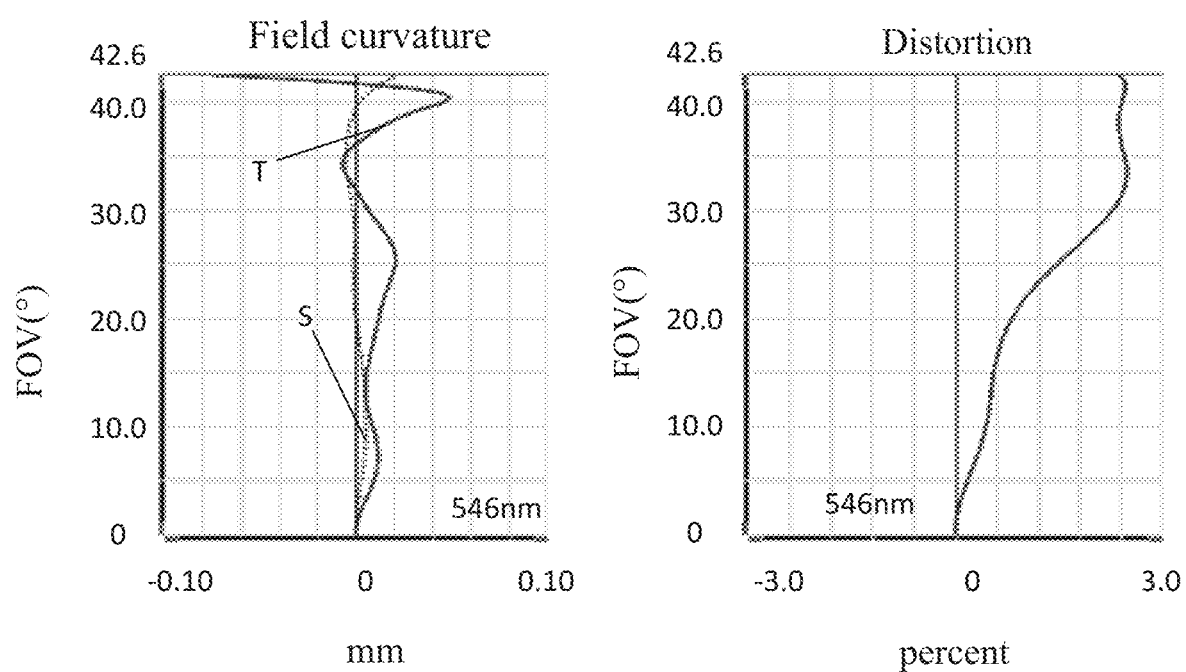
FIG. 4 is a schematic diagram of a field curvature and a distortion of the camera optical lens shown in FIG. 1.

FIG. 2 and FIG. 3 respectively illustrate a longitudinal aberration and a lateral color of light with wavelengths of 656 nm, 587 nm, 546 nm, 486 nm, and 436 nm after passing the camera optical lens 10 according to Embodiment 1. FIG. 4 illustrates a field curvature and a distortion of light with a wavelength of 546 nm after passing the camera optical lens 10 according to Embodiment 1, in which a field curvature S is a field curvature in a sagittal direction and T is a field curvature in a tangential direction.

Table 21 in the following shows various values of Embodiments 1, 2, 3, 4 and Comparative Embodiment, and also values corresponding to parameters which are specified in the above conditions. As shown in Table 21, Embodiment 1 satisfies the above conditions.

In the present embodiment, the entrance pupil diameter (ENPD) of the camera optical lens 10 is 3.896 mm. The image height of 1.0 H is 7.150 mm mm. The FOV is 85.20°. Thus, the camera optical lens 10 satisfies design requirements of large aperture, ultra-thin and wide-angle while the on-axis and off-axis aberrations are sufficiently corrected, thereby achieving excellent optical characteristics.

Embodiment 2

Embodiment 2 is basically the same as Embodiment 1, the meaning of its symbols is the same as that of Embodiment 1, in the following, only the differences are listed.

A fifth lens L5 has an object side surface being convex in a paraxial region and an image side surface being concave in the paraxial region. A fourth lens L4 has a negative refractive power. The fifth lens L5 has a positive refractive power.

Figure 5:
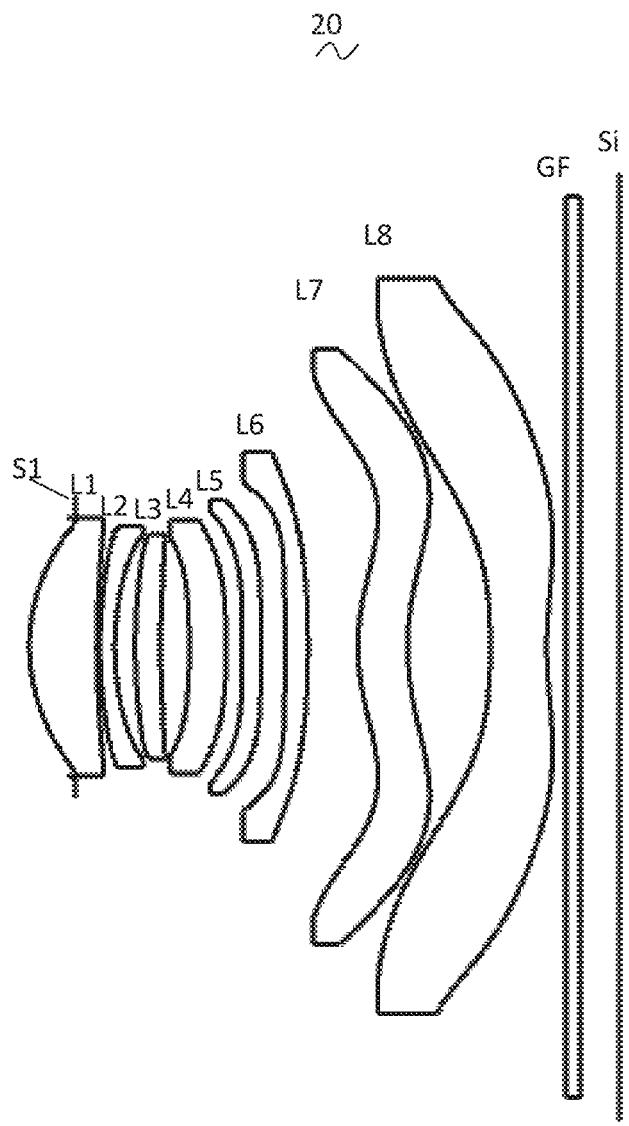
FIG. 5 is a schematic diagram of a structure of a camera optical lens in accordance with Embodiment 2 of the present invention.

FIG. 5 shows a schematic diagram of a structure of a camera optical lens 20 according to Embodiment 2 of the present invention. Table 5 and table 6 show the design data of a camera optical lens 20 in Embodiment 2 of the present invention.

TABLE 5

| | R | d | nd | | vd | |
|---|---|---|---|---|---|---|
| S1 | ∞ | d0 = −0.675 | | | | |
| R1 | 2.878 | d1 = 0.996 | nd1 | 1.5444 | v1 | 55.82 |
| R2 | 12.912 | d2 = 0.051 | | | | |
| R3 | 7.593 | d3 = 0.219 | nd2 | 1.6610 | v2 | 20.53 |
| R4 | 4.303 | d4 = 0.305 | | | | |
| R5 | 8.806 | d5 = 0.377 | nd3 | 1.5444 | v3 | 55.82 |
| R6 | 13.661 | d6 = 0.424 | | | | |
| R7 | −13.641 | d7 = 0.549 | nd4 | 1.5444 | v4 | 55.82 |
| R8 | −13.877 | d8 = 0.236 | | | | |

TABLE 5-continued

| | R | d | nd | | vd | |
|---|---|---|---|---|---|---|
| R9 | 433.551 | d9 = 0.279 | nd5 | 1.6700 | v5 | 19.39 |
| R10 | 1302.288 | d10 = 0.369 | | | | |
| R11 | −20.871 | d11 = 0.335 | nd6 | 1.5876 | v6 | 29.04 |
| R12 | −18.883 | d12 = 0.743 | | | | |
| R13 | 3.156 | d13 = 0.743 | nd7 | 1.5444 | v7 | 55.82 |
| R14 | 4.174 | d14 = 1.228 | | | | |
| R15 | −11.056 | d15 = 0.842 | nd8 | 1.5346 | v8 | 55.69 |
| R16 | 5.992 | d16 = 0.285 | | | | |
| R17 | ∞ | d17 = 0.210 | ndg | 1.5168 | vg | 64.17 |
| R18 | ∞ | d18 = 0.576 | | | | |

Table 6 shows aspherical surface data of each lens of the camera optical lens 20 in Embodiment 2 of the present invention.

TABLE 6

| | Conic coefficient | Aspheric surface coefficients | | | | |
|---|---|---|---|---|---|---|
| | k | A4 | A6 | A8 | A10 | A12 |
| R1 | −2.7664E−01 | 7.9158E−04 | −1.7741E−03 | 5.2690E−03 | −6.1163E−03 | 3.9298E−03 |
| R2 | 6.4365E+00 | −9.0276E−03 | 1.4585E−02 | −1.9206E−02 | 1.6132E−02 | −8.7582E−03 |
| R3 | 5.8378E+00 | −1.2657E−02 | 2.3764E−02 | −3.5347E−02 | 3.3705E−02 | −2.0122E−02 |
| R4 | −6.9730E+00 | 6.5631E−03 | 2.0367E−02 | −4.4140E−02 | 5.4960E−02 | −4.1577E−02 |
| R5 | 6.2092E+00 | −3.9119E−03 | 2.2272E−03 | −7.4167E−03 | 1.1354E−02 | −1.0267E−02 |
| R6 | 5.3712E+01 | −9.7379E−03 | 3.6393E−03 | −7.7528E−03 | 7.4487E−03 | −4.9277E−03 |
| R7 | 1.7748E+01 | −1.7278E−02 | −8.9801E−04 | 1.2514E−03 | −3.0485E−03 | 1.3874E−03 |
| R8 | 3.5156E+01 | −1.8048E−02 | −1.6930E−02 | 2.9762E−02 | −2.8551E−02 | 1.6896E−02 |
| R9 | −9.9972E+02 | −5.9699E−03 | −5.5234E−02 | 6.2870E−02 | −4.4976E−02 | 2.1774E−02 |
| R10 | 1.0000E+03 | 1.0432E−02 | −4.6739E−02 | 3.7142E−02 | −1.9646E−02 | 7.1560E−03 |
| R11 | 2.0053E+01 | 1.7751E−02 | −1.2631E−02 | 4.1820E−03 | −1.2138E−03 | 2.4113E−04 |
| R12 | −4.9202E+02 | −1.9833E−02 | 7.1499E−03 | −1.9374E−03 | 2.5643E−04 | −5.3947E−06 |
| R13 | −6.0354E+00 | −2.6108E−03 | −3.6832E−03 | 6.1838E−04 | −5.6316E−05 | 2.9292E−06 |
| R14 | −2.2228E+00 | −7.3552E−04 | −4.4379E−03 | 9.6919E−04 | −1.2444E−04 | 1.0171E−05 |
| R15 | −8.4165E+01 | −3.2477E−02 | 6.3963E−03 | −8.3420E−04 | 7.5447E−05 | −4.5352E−06 |
| R16 | −9.0064E+00 | −2.2540E−02 | 3.5235E−03 | −4.4659E−04 | 4.2010E−05 | −2.6488E−06 |

| | Conic coefficient | Aspheric surface coefficients | | | |
|---|---|---|---|---|---|
| | k | A14 | A16 | A18 | A20 |
| R1 | −2.7664E−01 | −1.5221E−03 | 3.5189E−04 | −4.4861E−05 | 2.4230E−06 |
| R2 | 6.4365E+00 | 3.0739E−03 | −6.7587E−04 | 8.4510E−05 | −4.5730E−06 |
| R3 | 5.8378E+00 | 7.6693E−03 | −1.8141E−03 | 2.4198E−04 | −1.3841E−05 |
| R4 | −6.9730E+00 | 1.9751E−02 | −5.7235E−03 | 9.2325E−04 | −6.3350E−05 |
| R5 | 6.2092E+00 | 5.8416E−03 | −1.9628E−03 | 3.5873E−04 | −2.7190E−05 |
| R6 | 5.3712E+01 | 2.2404E−03 | −6.2889E−04 | 9.4902E−05 | −5.2234E−06 |
| R7 | 1.7748E+01 | 1.8065E−04 | −3.6408E−04 | 1.1960E−04 | −1.3017E−05 |
| R8 | 3.5156E+01 | −6.2494E−03 | 1.4051E−03 | −1.7520E−04 | 9.3346E−06 |
| R9 | −9.9972E+02 | −6.9292E−03 | 1.3683E−03 | −1.5150E−04 | 7.1954E−06 |
| R10 | 1.0000E+03 | −1.7383E−03 | 2.6398E−04 | −2.2605E−05 | 8.4352E−07 |
| R11 | 2.0053E+01 | −2.9068E−05 | 1.6282E−06 | −3.6130E−08 | 3.1067E−09 |
| R12 | −4.9202E+02 | −2.7190E−06 | 3.5842E−07 | −1.9298E−08 | 4.0783E−10 |
| R13 | −6.0354E+00 | −2.5193E−08 | −5.8813E−09 | 2.9154E−10 | −4.3314E−12 |
| R14 | −2.2228E+00 | −5.1951E−07 | 1.5859E−08 | −2.6218E−10 | 1.7906E−12 |
| R15 | −8.4165E+01 | 1.7627E−07 | −4.2581E−09 | 5.8305E−11 | −3.4719E−13 |
| R16 | −9.0064E+00 | 1.0615E−07 | −2.5867E−09 | 3.5010E−11 | −2.0230E−13 |

Table 7 and table 8 show design data of inflexion points and arrest points of respective lens in the camera optical lens 20 according to Embodiment 2 of the present invention.

TABLE 7

| | Number of inflexion points | Inflexion point position 1 | Inflexion point position 2 |
|---|---|---|---|
| P1R1 | 1 | 1.895 | / |
| P1R2 | 1 | 1.525 | / |
| P2R1 | 0 | / | / |
| P2R2 | 0 | / | / |
| P3R1 | 0 | / | / |
| P3R2 | 2 | 0.925 | 1.325 |
| P4R1 | 0 | / | / |
| P4R2 | 1 | 1.775 | / |
| P5R1 | 1 | 0.155 | / |
| P5R2 | 2 | 0.335 | 2.165 |
| P6R1 | 1 | 2.455 | / |
| P6R2 | 0 | / | / |
| P7R1 | 2 | 1.115 | 3.275 |
| P7R2 | 2 | 1.295 | 4.385 |
| P8R1 | 2 | 2.875 | 5.235 |
| P8R2 | 2 | 0.805 | 4.935 |

TABLE 8

| | Number of arrest points | Arrest point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 1 | 0.235 |
| P5R2 | 1 | 0.445 |

TABLE 8-continued

| | Number of arrest points | Arrest point position 1 |
|---|---|---|
| P6R1 | 0 | / |
| P6R2 | 0 | / |
| P7R1 | 1 | 1.975 |
| P7R2 | 1 | 2.255 |
| P8R1 | 0 | / |
| P8R2 | 1 | 1.565 |

Figure 6:
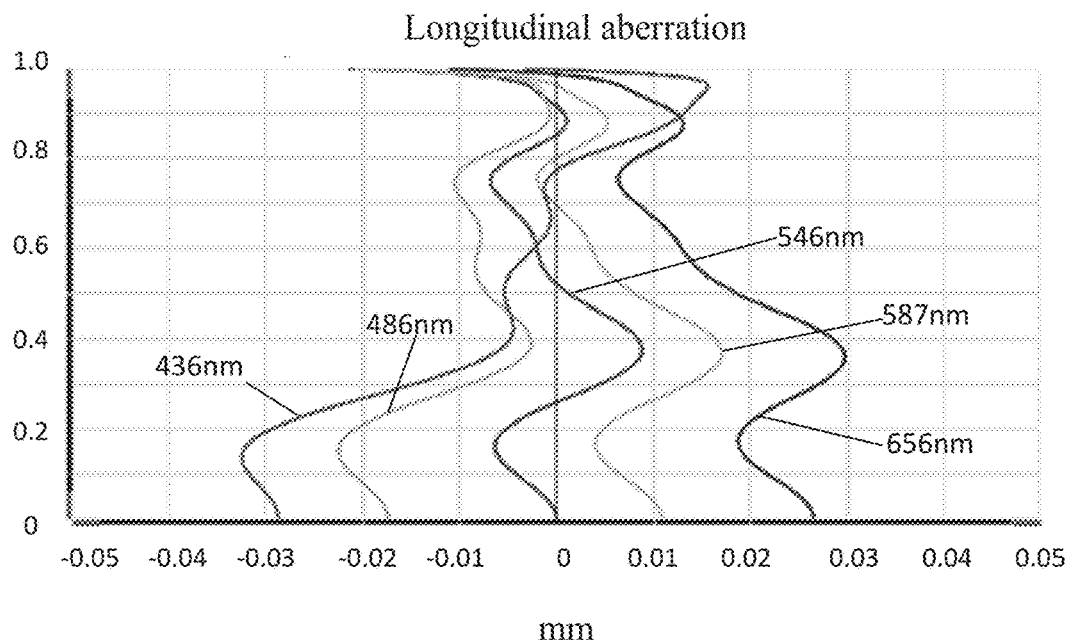
FIG. 6 is a schematic diagram of a longitudinal aberration of the camera optical lens shown in FIG. 5.
Figure 7:
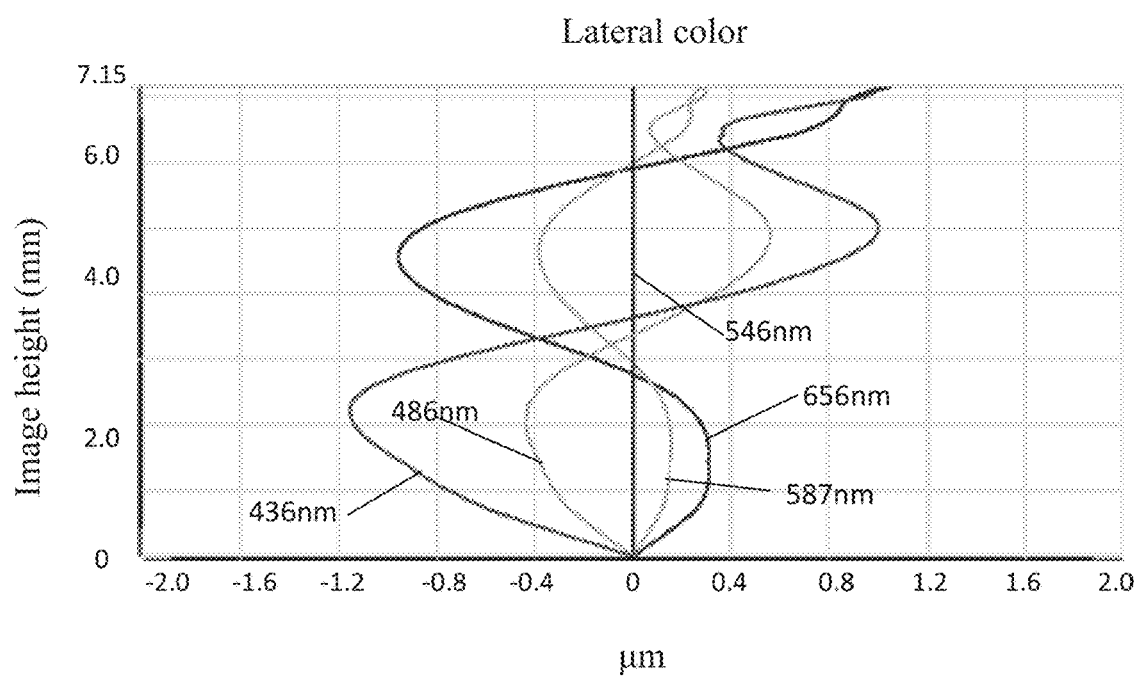
FIG. 7 is a schematic diagram of a lateral color of the camera optical lens shown in FIG. 5.
Figure 8:
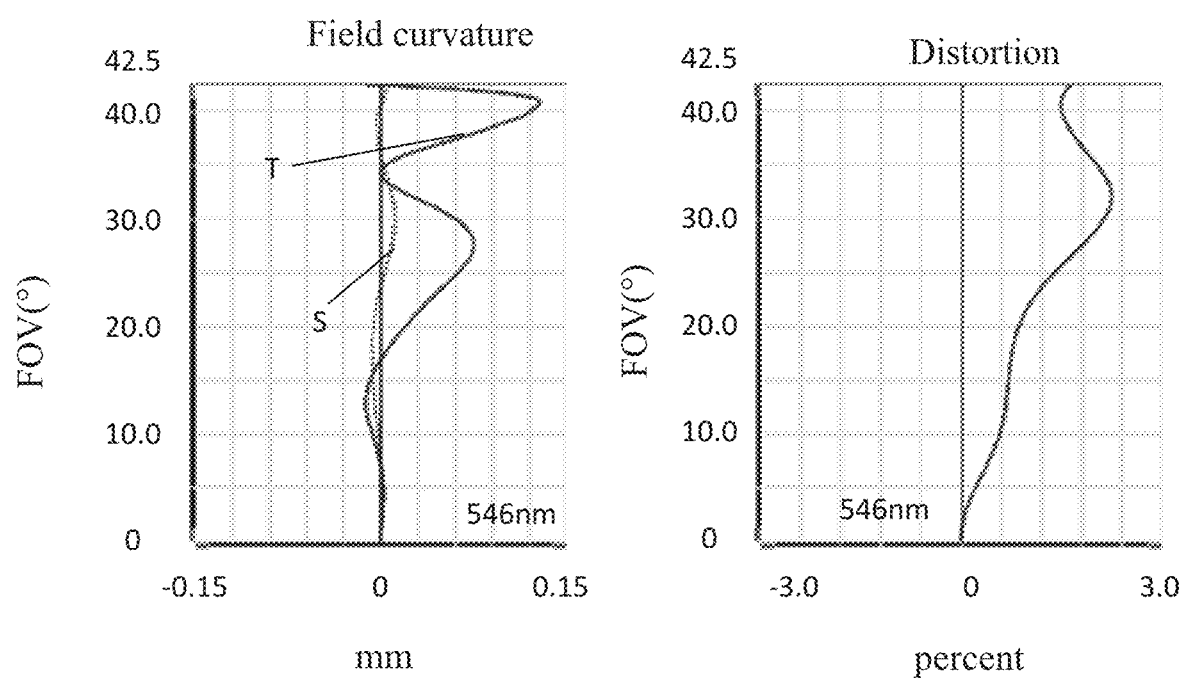
FIG. 8 is a schematic diagram of a field curvature and a distortion of the camera optical lens shown in FIG. 5.

FIG. 6 and FIG. 7 respectively illustrate a longitudinal aberration and a lateral color of light with wavelengths of 656 nm, 587 nm, 546 nm, 486 nm, and 436 nm after passing the camera optical lens 20 according to Embodiment 2. FIG. 8 illustrates a field curvature and a distortion of light with a wavelength of 546 nm after passing the camera optical lens 10 according to Embodiment 2, in which a field curvature S is a field curvature in a sagittal direction and T is a field curvature in a tangential direction.

As shown in Table 21, Embodiment 2 satisfies the above conditions.

In the present embodiment, an entrance pupil diameter (ENPD) of the camera optical lens is 3.896 mm. An image height of 1.0 H is 7.150 mm. An FOV is 85.00°. Thus, the camera optical lens 20 satisfies design requirements of large aperture, ultra-thin and wide-angle while the on-axis and off-axis aberrations are sufficiently corrected, thereby achieving excellent optical characteristics.

Embodiment 3

Embodiment 3 is basically the same as Embodiment 1 and involves symbols having the same meanings as Embodiment 1, and only differences therebetween will be described in the following.

A sixth lens L6 has an object side surface being convex in a paraxial region and an image side surface being concave in the paraxial region. The sixth lens L6 has a negative refractive power.

Figure 9:
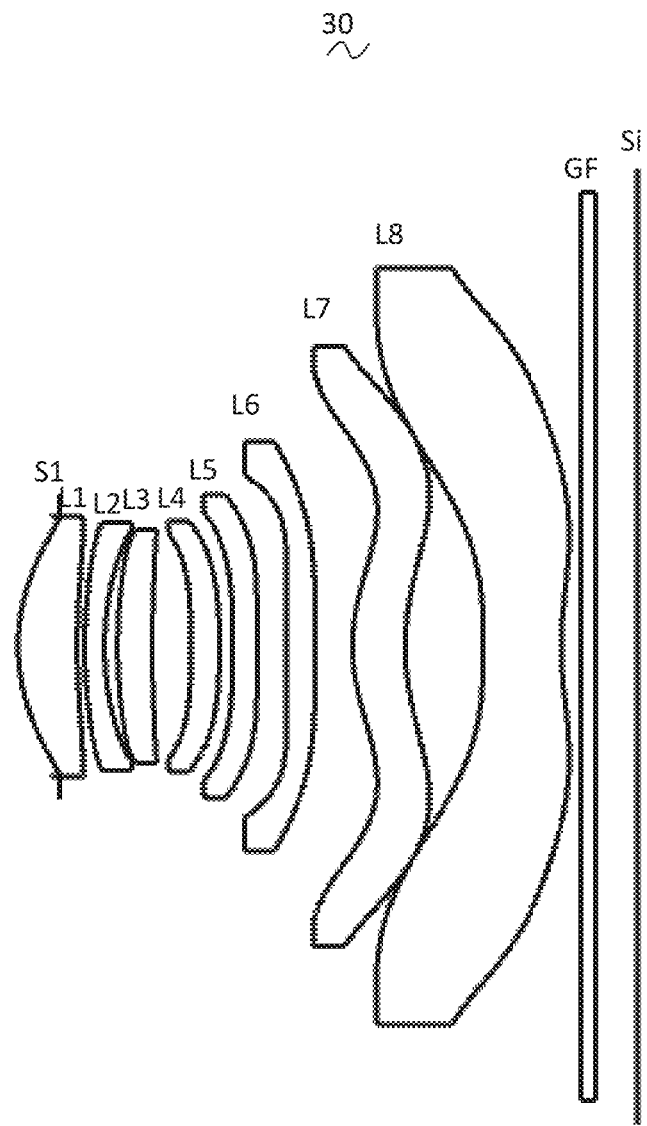
FIG. 9 is a schematic diagram of a structure of a camera optical lens in accordance with Embodiment 3 of the present invention.

FIG. 9 shows a schematic diagram of a structure of a camera optical lens 30 according to Embodiment 3 of the present invention. Tables 9 and 10 show design data of a camera optical lens 30 in Embodiment 3 of the present invention.

TABLE 9

| | R | d | nd | vd |
|---|---|---|---|---|
| S1 | ∞ | d0 = −0.588 | | |
| R1 | 3.066 | d1 = 0.851 | nd1 1.5444 | v1 55.82 |
| R2 | 9.723 | d2 = 0.106 | | |
| R3 | 6.860 | d3 = 0.291 | nd2 1.6610 | v2 20.53 |
| R4 | 4.495 | d4 = 0.183 | | |
| R5 | 7.390 | d5 = 0.499 | nd3 1.5444 | v3 55.82 |
| R6 | 14.236 | d6 = 0.565 | | |
| R7 | −14.527 | d7 = 0.410 | nd4 1.5444 | v4 55.82 |
| R8 | −10.175 | d8 = 0.189 | | |
| R9 | −20.125 | d9 = 0.347 | nd5 1.6700 | v5 19.39 |
| R10 | −402.397 | d10 = 0.414 | | |
| R11 | 318.568 | d11 = 0.427 | nd6 1.5876 | v6 29.04 |
| R12 | 159.363 | d12 = 0.535 | | |
| R13 | 2.646 | d13 = 0.757 | nd7 1.5444 | v7 55.82 |
| R14 | 3.722 | d14 = 1.132 | | |
| R15 | −17.053 | d15 = 1.125 | nd8 1.5346 | v8 55.69 |
| R16 | 4.870 | d16 = 0.282 | | |
| R15 | ∞ | d17 = 0.210 | ndg 1.5168 | vg 64.17 |
| R16 | ∞ | d18 = 0.595 | | |

Table 10 shows aspherical surface data of each lens of the camera optical lens 30 in Embodiment 3 of the present invention.

TABLE 10

| | Conic coefficient | Aspheric surface coefficients | | | | |
|---|---|---|---|---|---|---|
| | k | A4 | A6 | A8 | A10 | A12 |
| R1 | −4.3789E−01 | 8.9812E−04 | −2.5006E−03 | 5.2927E−03 | −6.1199E−03 | 3.9241E−03 |
| R2 | −2.2289E+01 | −1.2137E−02 | 1.4611E−02 | −1.9154E−02 | 1.6127E−02 | −8.7575E−03 |
| R3 | −2.4746E+00 | −1.6438E−02 | 2.4679E−02 | −3.5337E−02 | 3.3716E−02 | −2.0125E−02 |
| R4 | −6.6356E+00 | 2.2641E−03 | 1.9707E−02 | −4.3875E−02 | 5.4906E−02 | −4.1610E−02 |
| R5 | 4.9216E+00 | −3.1365E−03 | 1.1139E−03 | −7.2070E−03 | 1.1333E−02 | −1.0282E−02 |
| R6 | 2.8898E+01 | −7.2738E−03 | 3.2696E−03 | −7.4505E−03 | 7.4637E−03 | −4.9555E−03 |
| R7 | 3.5315E+01 | −1.8557E−02 | −4.3115E−04 | 9.9902E−05 | −2.9493E−03 | 1.5159E−03 |
| R8 | 1.4507E+00 | −1.2173E−02 | −2.0845E−02 | 3.0117E−02 | −2.8453E−02 | 1.6890E−02 |
| R9 | −2.4348E+02 | 1.6313E−03 | −5.5854E−02 | 6.3089E−02 | −4.4980E−02 | 2.1764E−02 |
| R10 | 5.9490E+02 | 1.2946E−02 | −4.6181E−02 | 3.7054E−02 | −1.9641E−02 | 7.1599E−03 |
| R11 | −1.0000E+03 | 1.6372E−02 | −1.2973E−02 | 4.3170E−03 | −1.2246E−03 | 2.4056E−04 |
| R12 | 6.2029E+02 | −2.0590E−02 | 7.1148E−03 | −1.9506E−03 | 2.5598E−04 | −5.3490E−06 |
| R13 | −5.4915E+00 | −2.5379E−03 | −3.6999E−03 | 6.1775E−04 | −5.6313E−05 | 2.9305E−06 |
| R14 | −2.9617E+00 | −4.5686E−04 | −4.4405E−03 | 9.6807E−04 | −1.2444E−04 | 1.0173E−05 |
| R15 | −2.6376E+01 | −3.2200E−02 | 6.4012E−03 | −8.3419E−04 | 7.5446E−05 | −4.5352E−06 |
| R16 | −1.1368E+01 | −2.2079E−02 | 3.5251E−03 | −4.4671E−04 | 4.2005E−05 | −2.6489E−06 |

| | Conic coefficient | Aspheric surface coefficients | | | |
|---|---|---|---|---|---|
| | k | A14 | A16 | A18 | A20 |
| R1 | −4.3789E−01 | −1.5228E−03 | 3.5207E−04 | −4.4792E−05 | 2.4203E−06 |
| R2 | −2.2289E+01 | 3.0741E−03 | −6.7585E−04 | 8.4500E−05 | −4.5644E−06 |
| R3 | −2.4746E+00 | 7.6681E−03 | −1.8144E−03 | 2.4212E−04 | −1.3844E−05 |
| R4 | −6.6356E+00 | 1.9754E−02 | −5.7198E−03 | 9.2370E−04 | −6.3694E−05 |
| R5 | 4.9216E+00 | 5.8384E−03 | −1.9593E−03 | 3.6018E−04 | −2.7893E−05 |
| R6 | 2.8898E+01 | 2.2406E−03 | −6.2599E−04 | 9.6063E−05 | −5.7709E−06 |
| R7 | 3.5315E+01 | 1.9826E−04 | −3.7476E−04 | 1.1477E−04 | −1.1573E−05 |
| R8 | 1.4507E+00 | −6.2537E−03 | 1.4047E−03 | −1.7517E−04 | 9.3353E−06 |
| R9 | −2.4348E+02 | −6.9300E−03 | 1.3686E−03 | −1.5152E−04 | 7.1893E−06 |

TABLE 10-continued

| | | | | |
|---|---|---|---|---|
| R10 | 5.9490E+02 | −1.7380E−03 | 2.6394E−04 | −2.2618E−05 | 8.4272E−07 |
| R11 | −1.0000E+03 | −2.8851E−05 | 1.6807E−06 | −3.5813E−08 | 1.3869E−09 |
| R12 | 6.2029E+02 | −2.7131E−06 | 3.6052E−07 | −1.9203E−08 | 3.7940E−10 |
| R13 | −5.4915E+00 | −2.5075E−08 | −5.8762E−09 | 2.9161E−10 | −4.3500E−12 |
| R14 | −2.9617E+00 | −5.1938E−07 | 1.5862E−08 | −2.6217E−10 | 1.7826E−12 |
| R15 | −2.6376E+01 | 1.7627E−07 | −4.2582E−09 | 5.8304E−11 | −3.4717E−13 |
| R16 | −1.1368E+01 | 1.0615E−07 | −2.5867E−09 | 3.5011E−11 | −2.0224E−13 |

Table 11 and table 12 show Embodiment 3 design data of inflexion points and arrest points of respective lens in the camera optical lens 30 according to Embodiment 3 of the present invention.

TABLE 11

| | Number of inflexion points | Inflexion point position 1 | Inflexion point position 2 | Inflexion point position 3 |
|---|---|---|---|---|
| P1R1 | 1 | 1.725 | / | / |
| P1R2 | 2 | 1.095 | 1.885 | / |
| P2R1 | 0 | / | / | / |
| P2R2 | 0 | / | / | / |
| P3R1 | 0 | / | / | / |
| P3R2 | 2 | 0.925 | 1.335 | / |
| P4R1 | 0 | / | / | / |
| P4R2 | 0 | / | / | / |
| P5R1 | 0 | / | / | / |
| P5R2 | 3 | 0.145 | 0.345 | 2.135 |
| P6R1 | 2 | 0.895 | 2.535 | / |
| P6R2 | 1 | 0.165 | / | / |
| P7R1 | 2 | 1.125 | 3.285 | / |
| P7R2 | 2 | 1.285 | 4.025 | / |
| P8R1 | 2 | 2.835 | 5.225 | / |
| P8R2 | 3 | 0.835 | 5.085 | 5.785 |

TABLE 12

| | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 2 | 0.275 | 0.385 |
| P6R1 | 1 | 1.215 | / |
| P6R2 | 1 | 0.285 | / |
| P7R1 | 1 | 2.035 | / |
| P7R2 | 1 | 2.265 | / |
| P8R1 | 1 | 4.945 | / |
| P8R2 | 1 | 1.665 | / |

Figure 10:
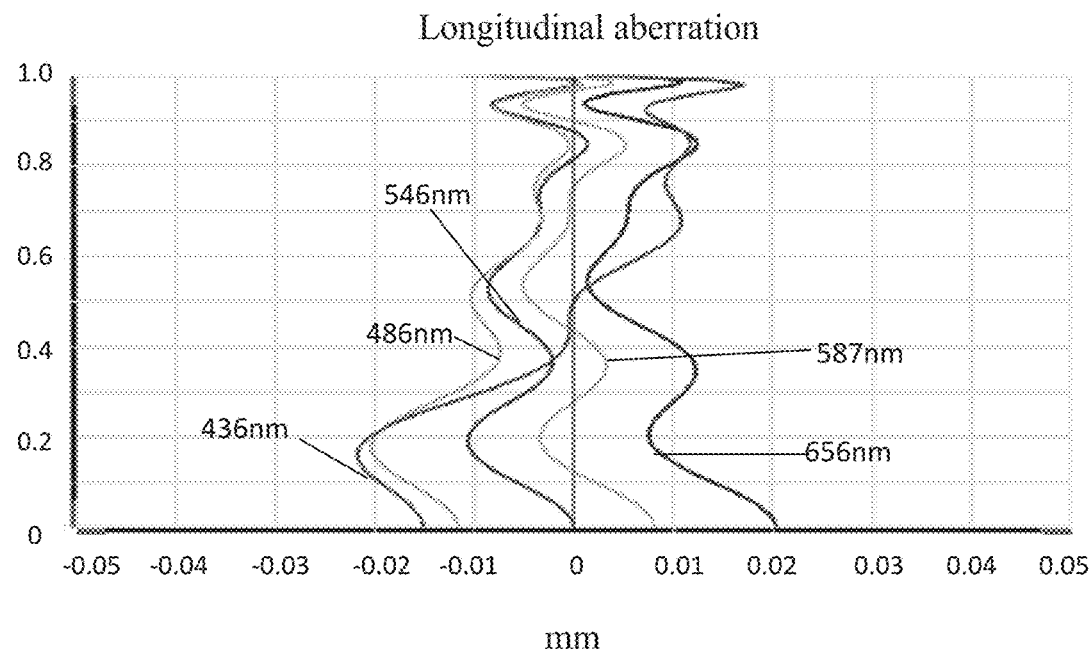
FIG. 10 is a schematic diagram of a longitudinal aberration of the camera optical lens shown in FIG. 9.
Figure 11:
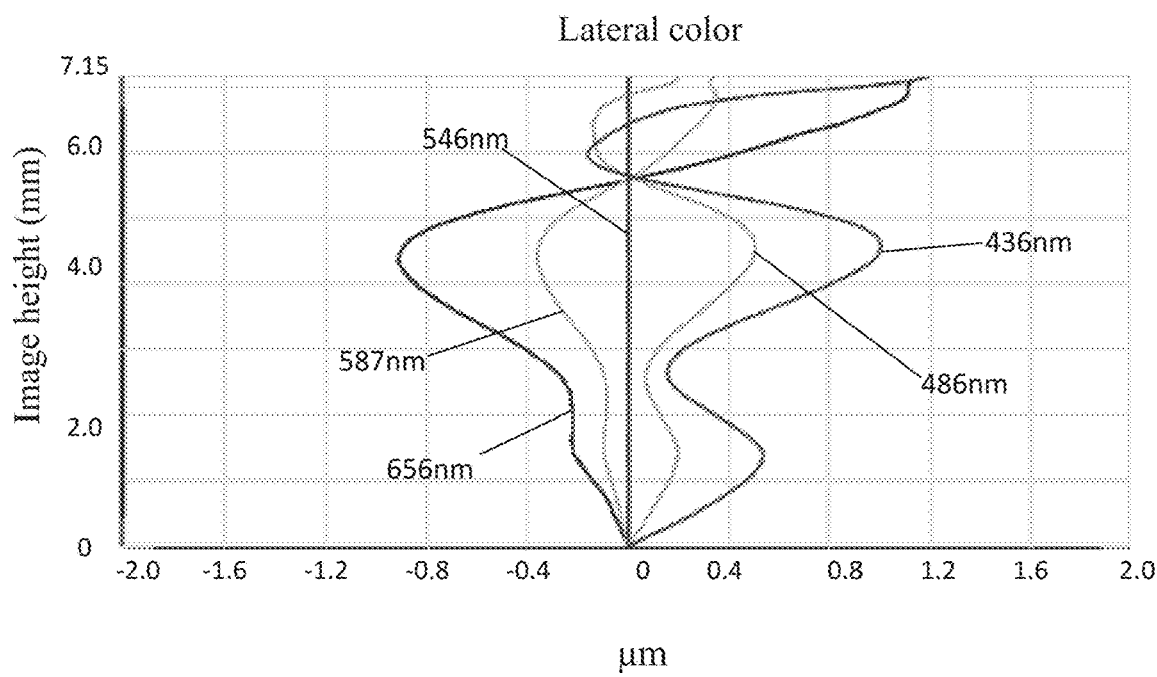
FIG. 11 is a schematic diagram of a lateral color of the camera optical lens shown in FIG. 9.
Figure 12:
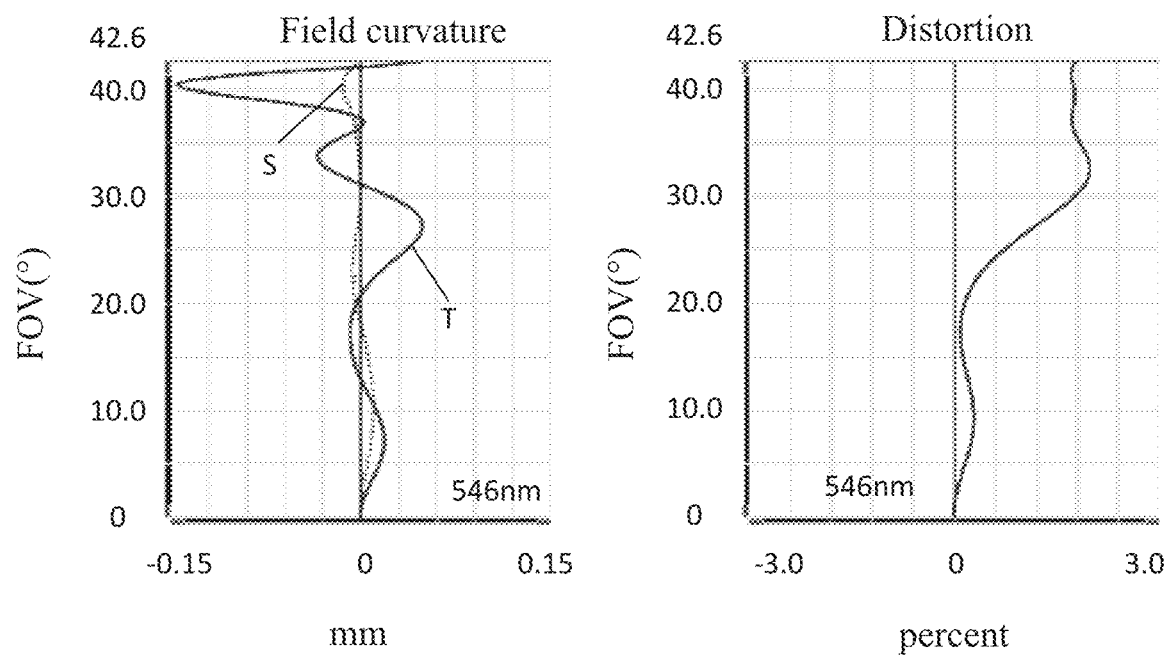
FIG. 12 is a schematic diagram of a field curvature and a distortion of the camera optical lens shown in FIG. 9.

FIG. 10 and FIG. 11 respectively illustrate a longitudinal aberration and a lateral color of light with wavelengths of 656 nm, 587 nm, 546 nm, 486 nm, and 436 nm after passing the camera optical lens 30 according to Embodiment 3. FIG. 12 illustrates a field curvature and a distortion of light with a wavelength of 546 nm after passing the camera optical lens 30 according to Embodiment 3, in which a field curvature S is a field curvature in a sagittal direction and T is a field curvature in a tangential direction.

Table 21 in the following lists values corresponding to the respective conditions. In the present Embodiment 3 in order to satisfy the above conditions.

In the present embodiment, an entrance pupil diameter (ENPD) of the camera optical lens is 3.896 mm. An image height of 1.0 H is 7.150 mm. An FOV is 85.20°. Thus, the camera optical lens 30 satisfies design requirements of large aperture, ultra-thin and wide-angle while the on-axis and off-axis aberrations are sufficiently corrected, thereby achieving excellent optical characteristics.

Embodiment 4

Embodiment 4 is basically the same as Embodiment 1 and involves symbols having the same meanings as Embodiment 1, and only differences therebetween will be described in the following.

Figure 13:
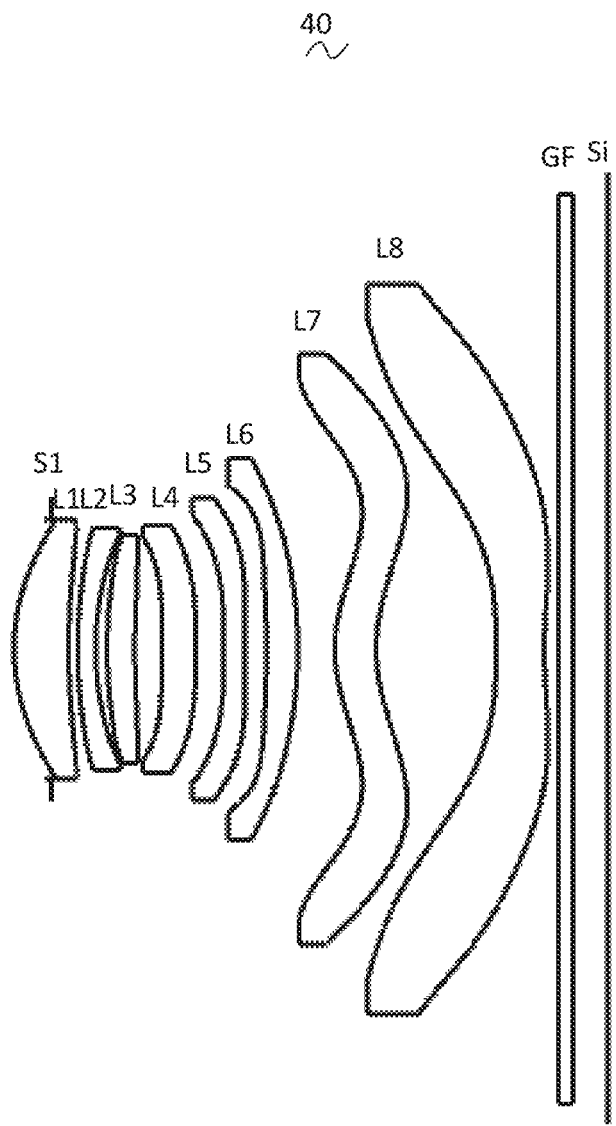
FIG. 13 is a schematic diagram of a structure of a camera optical lens in accordance with Embodiment 4 of the present invention.

FIG. 13 shows a schematic diagram of a structure of a camera optical lens 40 according to Embodiment 4 of the present invention. Tables 13 and 14 show design data of a camera optical lens 40 in Embodiment 4 of the present invention.

TABLE 13

| | R | d | nd | | vd | |
|---|---|---|---|---|---|---|
| S1 | ∞ | d0 = −0.566 | | | | |
| R1 | 3.129 | d1 = 0.814 | nd1 | 1.5444 | v1 | 55.82 |
| R2 | 8.986 | d2 = 0.136 | | | | |
| R3 | 6.062 | d3 = 0.271 | nd2 | 1.6610 | v2 | 20.53 |
| R4 | 4.147 | d4 = 0.173 | | | | |
| R5 | 6.942 | d5 = 0.418 | nd3 | 1.5444 | v3 | 55.82 |
| R6 | 12.734 | d6 = 0.417 | | | | |
| R7 | −18.174 | d7 = 0.506 | nd4 | 1.5444 | v4 | 55.82 |
| R8 | −11.572 | d8 = 0.414 | | | | |
| R9 | −17.763 | d9 = 0.323 | nd5 | 1.6700 | v5 | 19.39 |
| R10 | −225.335 | d10 = 0.318 | | | | |
| R11 | −9.149 | d11 = 0.470 | nd6 | 1.5876 | v6 | 29.04 |
| R12 | −7.304 | d12 = 0.556 | | | | |
| R13 | 2.2 | d13 = 0.622 | nd7 | 1.5444 | v7 | 55.82 |
| R14 | 2.573 | d14 = 1.805 | | | | |
| R15 | −11.495 | d15 = 0.723 | nd8 | 1.5346 | v8 | 55.69 |
| R16 | 6.426 | d16 = 0.215 | | | | |
| R15 | ∞ | d17 = 0.210 | ndg | 1.5168 | vg | 64.17 |
| R16 | ∞ | d18 = 0.529 | | | | |

Table 14 shows aspherical surface data of each lens of the camera optical lens 40 in Embodiment 4 of the present invention.

TABLE 14

| | Conic coefficient | Aspheric surface coefficients | | | | |
|---|---|---|---|---|---|---|
| | k | A4 | A6 | A8 | A10 | A12 |
| R1 | −3.7697E−01 | 1.3868E−03 | −2.7216E−03 | 5.5149E−03 | −6.1285E−03 | 3.9192E−03 |
| R2 | −1.8502E+01 | −1.1194E−02 | 1.5086E−02 | −1.9222E−02 | 1.6128E−02 | −8.7522E−03 |

TABLE 14-continued

| | | | | | | |
|---|---|---|---|---|---|---|
| R3 | −7.3771E+00 | −1.7794E−02 | 2.4875E−02 | −3.5222E−02 | 3.3710E−02 | −2.0132E−02 |
| R4 | −6.1611E+00 | −9.2825E−04 | 1.9232E−02 | −4.3462E−02 | 5.4928E−02 | −4.1647E−02 |
| R5 | 2.4504E+00 | −3.0442E−03 | 1.1649E−03 | −7.4932E−03 | 1.1378E−02 | −1.0262E−02 |
| R6 | 4.7778E−01 | −8.0544E−03 | 2.3991E−03 | −7.1141E−03 | 7.4221E−03 | −4.9777E−03 |
| R7 | 6.0870E+01 | −2.1449E−02 | 2.3259E−05 | 6.5552E−04 | −2.8261E−03 | 1.4479E−03 |
| R8 | 5.4610E+00 | −1.4171E−02 | −1.8918E−02 | 2.9986E−02 | −2.8483E−02 | 1.6898E−02 |
| R9 | 4.3003E+00 | −3.4895E−03 | −5.4402E−02 | 6.2590E−02 | −4.4926E−02 | 2.1783E−02 |
| R10 | 9.8987E+02 | 1.3951E−02 | −4.7376E−02 | 3.7140E−02 | −1.9633E−02 | 7.1623E−03 |
| R11 | −1.1648E+02 | 2.3418E−02 | −1.4780E−02 | 4.5270E−03 | −1.2150E−03 | 2.3728E−04 |
| R12 | −1.3497E+01 | −1.4890E−02 | 7.0059E−03 | −1.9952E−03 | 2.5497E−04 | −4.9905E−06 |
| R13 | −4.8558E+00 | −3.4691E−03 | −3.7434E−03 | 6.1952E−04 | −5.6127E−05 | 2.9383E−06 |
| R14 | −4.1936E+00 | 7.9513E−05 | −4.4670E−03 | 9.7067E−04 | −1.2436E−04 | 1.0169E−05 |
| R15 | −1.2428E+01 | −3.2323E−02 | 6.3989E−03 | −8.3420E−04 | 7.5447E−05 | −4.5352E−06 |
| R16 | −2.5294E+01 | −2.2339E−02 | 3.5251E−03 | −4.4660E−04 | 4.2010E−05 | −2.6488E−06 |

| | Conic coefficient | Aspheric surface coefficients | | | |
|---|---|---|---|---|---|
| | k | A14 | A16 | A18 | A20 |
| R1 | −3.7697E−01 | −1.5224E−03 | 3.5240E−04 | −4.4760E−05 | 2.3999E−06 |
| R2 | −1.8502E+01 | 3.0746E−03 | −6.7610E−04 | 8.4358E−05 | −4.5374E−06 |
| R3 | −7.3771E+00 | 7.6665E−03 | −1.8143E−03 | 2.4226E−04 | −1.3849E−05 |
| R4 | −6.1611E+00 | 1.9746E−02 | −5.7179E−03 | 9.2512E−04 | −6.4026E−05 |
| R5 | 2.4504E+00 | 5.8375E−03 | −1.9633E−03 | 3.5912E−04 | −2.7288E−05 |
| R6 | 4.7778E−01 | 2.2340E−03 | −6.2521E−04 | 9.6733E−05 | −5.8691E−06 |
| R7 | 6.0870E+01 | 1.7417E−04 | −3.7194E−04 | 1.1759E−04 | −1.2318E−05 |
| R8 | 5.4610E+00 | −6.2511E−03 | 1.4043E−03 | −1.7558E−04 | 9.3785E−06 |
| R9 | 4.3003E+00 | −6.9307E−03 | 1.3685E−03 | −1.5132E−04 | 7.1382E−06 |
| R10 | 9.8987E+02 | −1.7375E−03 | 2.6393E−04 | −2.2641E−05 | 8.4315E−07 |
| R11 | −1.1648E+02 | −2.9234E−05 | 1.6788E−06 | −2.8551E−08 | 1.9361E−09 |
| R12 | −1.3497E+01 | −2.6692E−06 | 3.6234E−07 | −1.9499E−08 | 3.3445E−10 |
| R13 | −4.8558E+00 | −2.5148E−08 | −5.9105E−09 | 2.8993E−10 | −4.2545E−12 |
| R14 | −4.1936E+00 | −5.1973E−07 | 1.5853E−08 | −2.6197E−10 | 1.8037E−12 |
| R15 | −1.2428E+01 | 1.7627E−07 | −4.2582E−09 | 5.8301E−11 | −3.4735E−13 |
| R16 | −2.5294E+01 | 1.0615E−07 | −2.5867E−09 | 3.5009E−11 | −2.0237E−13 |

Table 15 and table 16 show Embodiment 4 design data of inflexion points and arrest points of respective lens in the camera optical lens 40 according to Embodiment 4 of the present invention.

TABLE 15

| | Number of inflexion points | Inflexion point position 1 | Inflexion point position 2 | Inflexion point position 3 |
|---|---|---|---|---|
| P1R1 | 1 | 1.865 | / | / |
| P1R2 | 2 | 1.565 | 1.815 | / |
| P2R1 | 0 | / | / | / |
| P2R2 | 0 | / | / | / |
| P3R1 | 0 | / | / | / |
| P3R2 | 2 | 0.835 | 1.495 | / |
| P4R1 | 0 | / | / | / |
| P4R2 | 0 | / | / | / |
| P5R1 | 0 | / | / | / |
| P5R2 | 3 | 0.205 | 0.325 | 2.125 |
| P6R1 | 3 | 0.645 | 0.895 | 2.465 |
| P6R2 | 0 | / | / | / |
| P7R1 | 2 | 1.105 | 3.265 | / |
| P7R2 | 2 | 1.245 | 4.325 | / |
| P8R1 | 2 | 2.905 | 4.835 | / |
| P8R2 | 2 | 0.695 | 4.965 | / |

TABLE 16

| | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 2 | 1.415 | 1.545 |
| P4R1 | 0 | / | / |
| P4R2 | 0 | / | / |
| P5R1 | 0 | / | / |
| P5R2 | 0 | / | / |
| P6R1 | 0 | / | / |
| P6R2 | 0 | / | / |
| P7R1 | 1 | 2.045 | / |
| P7R2 | 1 | 2.325 | / |
| P8R1 | 0 | / | / |
| P8R2 | 1 | 1.335 | / |

Figure 14:
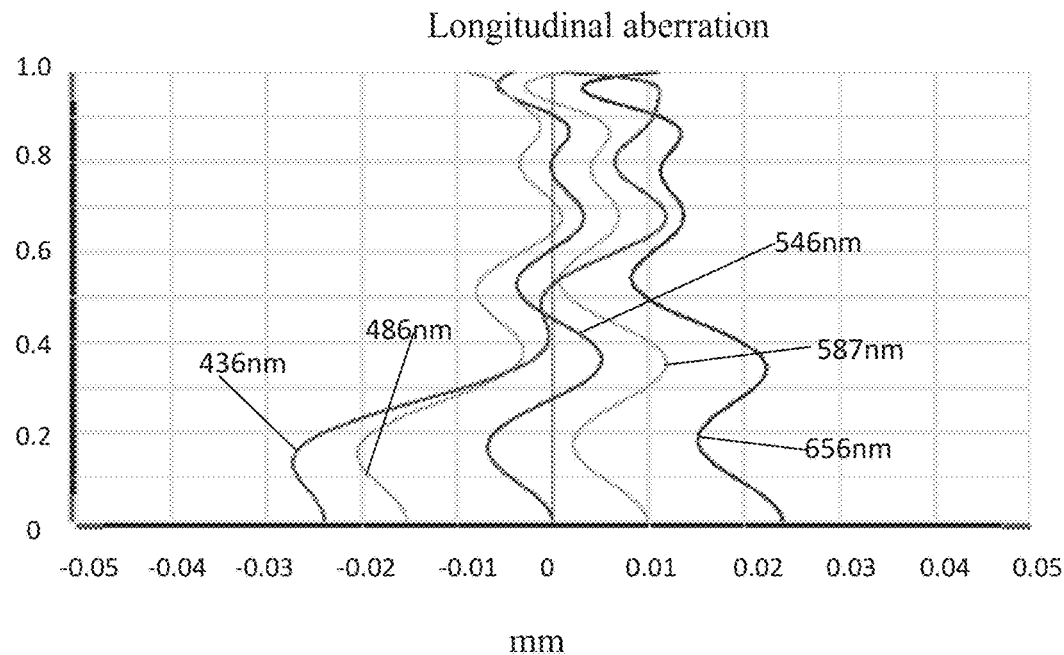
FIG. 14 is a schematic diagram of a longitudinal aberration of the camera optical lens shown in FIG. 13.
Figure 15:
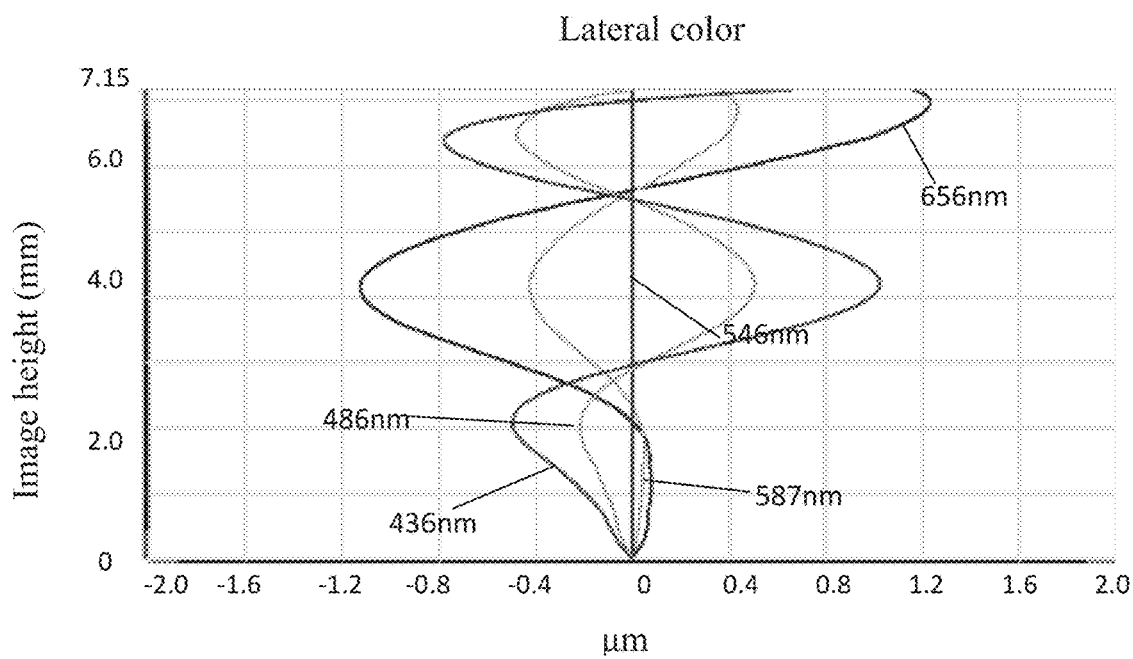
FIG. 15 is a schematic diagram of a lateral color of the camera optical lens shown in FIG. 13.
Figure 16:
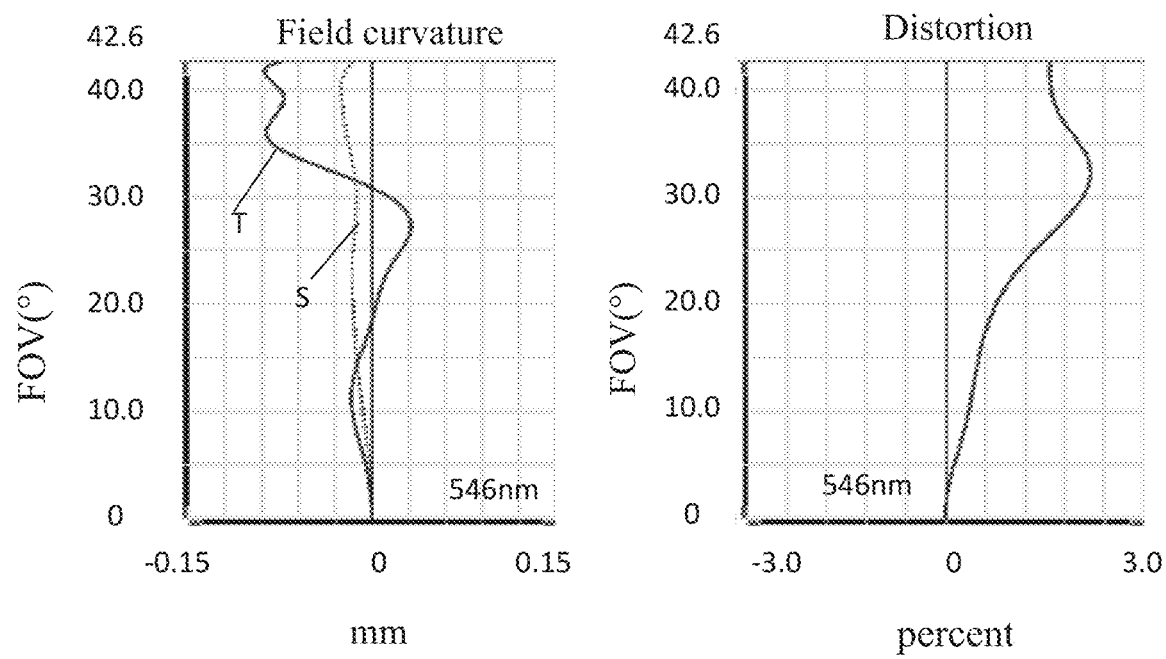
FIG. 16 is a schematic diagram of a field curvature and a distortion of the camera optical lens shown in FIG. 13.

FIG. 14 and FIG. 15 respectively illustrate a longitudinal aberration and a lateral color of light with wavelengths of 656 nm, 587 nm, 546 nm, 486 nm, and 436 nm after passing the camera optical lens 30 according to Embodiment 4. FIG. 16 illustrates a field curvature and a distortion of light with a wavelength of 546 nm after passing the camera optical lens 40 according to Embodiment 4, in which a field curvature S is a field curvature in a sagittal direction and T is a field curvature in a tangential direction.

Table 21 in the following lists values corresponding to the respective conditions. In the present Embodiment 4 in order to satisfy the above conditions.

In the present embodiment, an entrance pupil diameter (ENPD) of the camera optical lens is 3.896 mm. An image height of 1.0 H is 7.150 mm. An FOV is 85.20°. Thus, the camera optical lens 40 satisfies design requirements of large aperture, ultra-thin and wide-angle while the on-axis and off-axis aberrations are sufficiently corrected, thereby achieving excellent optical characteristics.

Comparative Embodiment

Comparative Embodiment is basically the same as Embodiment 1 and involves symbols having the same meanings as Embodiment 1, and only differences therebetween will be described in the following.

Figure 17:
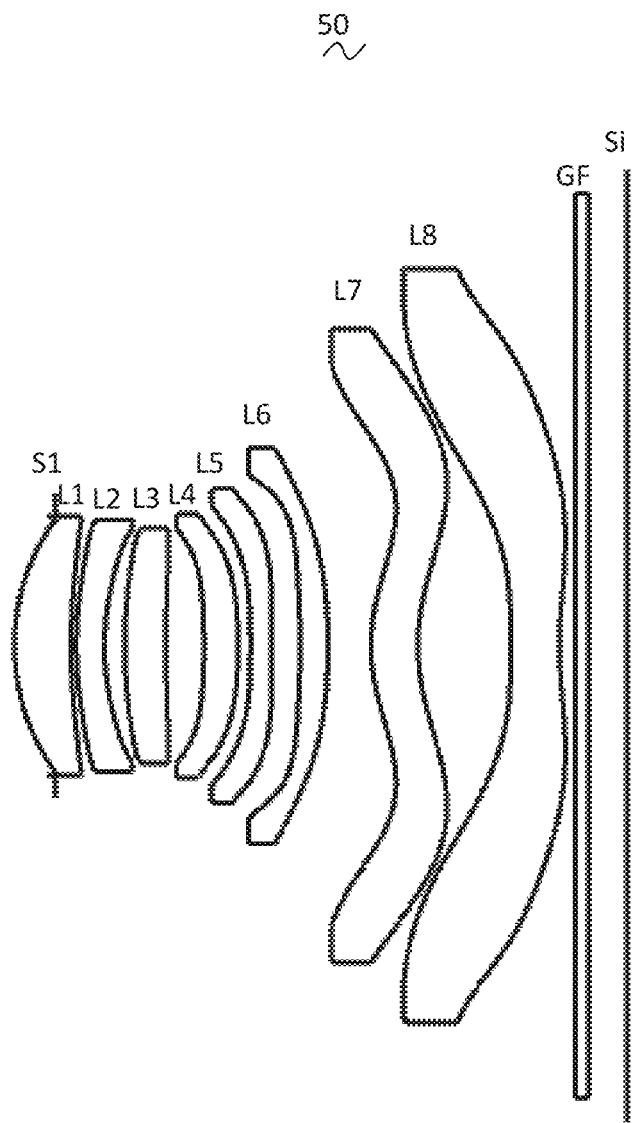
FIG. 17 is a schematic diagram of a structure of a camera optical lens in accordance with comparative Embodiment.

FIG. 17 shows a schematic diagram of a structure of a camera optical lens 50 according to Comparative Embodiment. Tables 17 and 18 show design data of a camera optical lens 50 in Comparative Embodiment.

TABLE 17

| | R | d | | nd | | vd |
|---|---|---|---|---|---|---|
| S1 | ∞ | d0 = | −0.614 | | | |
| R1 | 3.245 | d1 = | 0.848 | nd1 | 1.5444 | v1 55.82 |

TABLE 17-continued

| | R | d | | nd | | vd |
|---|---|---|---|---|---|---|
| R2 | 8.319 | d2 = | 0.080 | | | |
| R3 | 5.042 | d3 = | 0.426 | nd2 | 1.6610 | v2 20.53 |
| R4 | 3.694 | d4 = | 0.302 | | | |
| R5 | 7.208 | d5 = | 0.618 | nd3 | 1.5444 | v3 55.82 |
| R6 | 15.815 | d6 = | 0.570 | | | |
| R7 | −13.522 | d7 = | 0.512 | nd4 | 1.5444 | v4 55.82 |
| R8 | −8.541 | d8 = | 0.191 | | | |
| R9 | −14.614 | d9 = | 0.320 | nd5 | 1.6700 | v5 19.39 |
| R10 | −67.571 | d10 = | 0.427 | | | |
| R11 | −10.661 | d11 = | 0.418 | nd6 | 1.5876 | v6 29.04 |
| R12 | −9.300 | d12 = | 0.645 | | | |
| R13 | 2.575 | d13 = | 0.706 | nd7 | 1.5444 | v7 55.82 |
| R14 | 3.201 | d14 = | 1.394 | | | |
| R15 | −25.910 | d15 = | 0.734 | nd8 | 1.5346 | v8 55.69 |
| R16 | 5.906 | d16 = | 0.233 | | | |
| R15 | ∞ | d17 = | 0.210 | ndg | 1.5168 | vg 64.17 |
| R16 | ∞ | d18 = | 0.571 | | | |

Table 18 shows aspherical surface data of each lens of the camera optical lens 50 in Comparative Embodiment.

TABLE 18

| | Conic coefficient | Aspheric surface coefficients | | | | |
|---|---|---|---|---|---|---|
| | k | A4 | A6 | A8 | A10 | A12 |
| R1 | −2.1427E−01 | 2.0378E−03 | −2.3196E−03 | 5.3452E−03 | −6.1027E−03 | 3.9273E−03 |
| R2 | −3.0603E+00 | −1.1194E−02 | 1.4072E−02 | −1.9071E−02 | 1.6155E−02 | −8.7561E−03 |
| R3 | −6.6508E+00 | −1.8232E−02 | 2.4391E−02 | −3.5521E−02 | 3.3698E−02 | −2.0117E−02 |
| R4 | −1.1316E+01 | 4.4014E−03 | 1.9738E−02 | −4.4196E−02 | 5.4887E−02 | −4.1593E−02 |
| R5 | 2.9777E+00 | −3.3273E−03 | 2.9780E−04 | −6.6996E−03 | 1.1353E−02 | −1.0319E−02 |
| R6 | −5.5438E−01 | −8.4964E−03 | 4.5166E−03 | −7.6313E−03 | 7.3983E−03 | −4.9619E−03 |
| R7 | 2.6378E+01 | −1.9880E−02 | −5.9667E−04 | 3.5725E−04 | −3.0108E−03 | 1.4836E−03 |
| R8 | 1.0339E+01 | −1.8874E−02 | −1.8966E−02 | 3.0136E−02 | −2.8511E−02 | 1.6880E−02 |
| R9 | 2.3919E+01 | −5.0125E−03 | −5.5171E−02 | 6.3312E−02 | −4.4968E−02 | 2.1762E−02 |
| R10 | 5.7738E+02 | 1.4746E−02 | −4.6635E−02 | 3.7038E−02 | −1.9636E−02 | 7.1602E−03 |
| R11 | 5.7591E−01 | 2.3603E−02 | −1.3819E−02 | 4.3682E−03 | −1.2170E−03 | 2.3997E−04 |
| R12 | −4.5698E+00 | −1.8702E−02 | 7.2093E−03 | −1.9433E−03 | 2.5592E−04 | −5.3854E−06 |
| R13 | −5.2784E+00 | −2.2965E−03 | −3.7100E−03 | 6.1748E−04 | −5.6322E−05 | 2.9302E−06 |
| R14 | −3.4536E+00 | 6.7625E−04 | −4.4277E−03 | 9.6769E−04 | −1.2446E−04 | 1.0173E−05 |
| R15 | −7.5668E+00 | −3.2354E−02 | 6.3984E−03 | −8.3424E−04 | 7.5446E−05 | −4.5352E−06 |
| R16 | −9.2294E+00 | −2.2258E−02 | 3.5239E−03 | −4.4667E−04 | 4.2008E−05 | −2.6488E−06 |

| | Conic coefficient | Aspheric surface coefficients | | | |
|---|---|---|---|---|---|
| | k | A14 | A16 | A18 | A20 |
| R1 | −2.1427E−01 | −1.5226E−03 | 3.5204E−04 | −4.4794E−05 | 2.4168E−06 |
| R2 | −3.0603E+00 | 3.0732E−03 | −6.7603E−04 | 8.4499E−05 | −4.5452E−06 |
| R3 | −6.6508E+00 | 7.6715E−03 | −1.8138E−03 | 2.4208E−04 | −1.3890E−05 |
| R4 | −1.1316E+01 | 1.9758E−02 | −5.7204E−03 | 9.2334E−04 | −6.3582E−05 |
| R5 | 2.9777E+00 | 5.8253E−03 | −1.9615E−03 | 3.6037E−04 | −2.7668E−05 |
| R6 | −5.5438E−01 | 2.2380E−03 | −6.2622E−04 | 9.6162E−05 | −5.8695E−06 |
| R7 | 2.6378E+01 | 1.9055E−04 | −3.7510E−04 | 1.1516E−04 | −1.1209E−05 |
| R8 | 1.0339E+01 | −6.2533E−03 | 1.4050E−03 | −1.7500E−04 | 9.3460E−06 |
| R9 | 2.3919E+01 | −6.9317E−03 | 1.3684E−03 | −1.5144E−04 | 7.2081E−06 |
| R10 | 5.7738E+02 | −1.7381E−03 | 2.6392E−04 | −2.2624E−05 | 8.4238E−07 |
| R11 | 5.7591E−01 | −2.9068E−05 | 1.6588E−06 | −3.5023E−08 | 2.1164E−09 |
| R12 | −4.5698E+00 | −2.7174E−06 | 3.5996E−07 | −1.9240E−08 | 3.8385E−10 |
| R13 | −5.2784E+00 | −2.5090E−08 | −5.8770E−09 | 2.9159E−10 | −4.3499E−12 |
| R14 | −3.4536E+00 | −5.1940E−07 | 1.5861E−08 | −2.6222E−10 | 1.7801E−12 |
| R15 | −7.5668E+00 | 1.7627E−07 | −4.2581E−09 | 5.8306E−11 | −3.4719E−13 |
| R16 | −9.2294E+00 | 1.0615E−07 | −2.5867E−09 | 3.5010E−11 | −2.0231E−13 |

Table 19 and table 20 show Comparative Embodiment design data of inflexion points and arrest points of respective lens in the camera optical lens 50 according to Comparative Embodiment.

TABLE 19

|  | Number of inflexion points | Inflexion point position 1 | Inflexion point position 2 | Inflexion point position 3 |
|---|---|---|---|---|
| P1R1 | 0 | / | / | / |
| P1R2 | 0 | / | / | / |
| P2R1 | 0 | / | / | / |
| P2R2 | 0 | / | / | / |
| P3R1 | 0 | / | / | / |
| P3R2 | 2 | 0.835 | 1.535 | / |
| P4R1 | 1 | 1.685 | / | / |
| P4R2 | 1 | 1.815 | / | / |
| P5R1 | 1 | 2.015 | / | / |
| P5R2 | 1 | 2.195 | / | / |
| P6R1 | 1 | 2.505 | / | / |
| P6R2 | 0 | / | / | / |
| P7R1 | 3 | 1.135 | 3.325 | 4.365 |
| P7R2 | 3 | 1.325 | 4.355 | 4.715 |
| P8R1 | 2 | 2.905 | 5.295 | / |
| P8R2 | 3 | 0.815 | 4.945 | 5.765 |
| P9R1 | 0 | / | / | / |
| P9R2 | 0 | / | / | / |

TABLE 20

|  | Number of arrest points | Arrest point position 1 | Arrest point position 2 |
|---|---|---|---|
| P1R1 | 0 | / | / |
| P1R2 | 0 | / | / |
| P2R1 | 0 | / | / |
| P2R2 | 0 | / | / |
| P3R1 | 0 | / | / |
| P3R2 | 2 | 1.405 | 1.615 |
| P4R1 | 0 | / | / |
| P4R2 | 0 | / | / |
| P5R1 | 0 | / | / |
| P5R2 | 0 | / | / |
| P6R1 | 0 | / | / |
| P6R2 | 0 | / | / |
| P7R1 | 1 | 2.065 | / |
| P7R2 | 1 | 2.415 | / |
| P8R1 | 2 | 5.185 | 5.375 |
| P8R2 | 1 | 1.595 | / |
| P9R1 | 0 | / | / |
| P9R2 | 0 | / | / |

Figure 18:
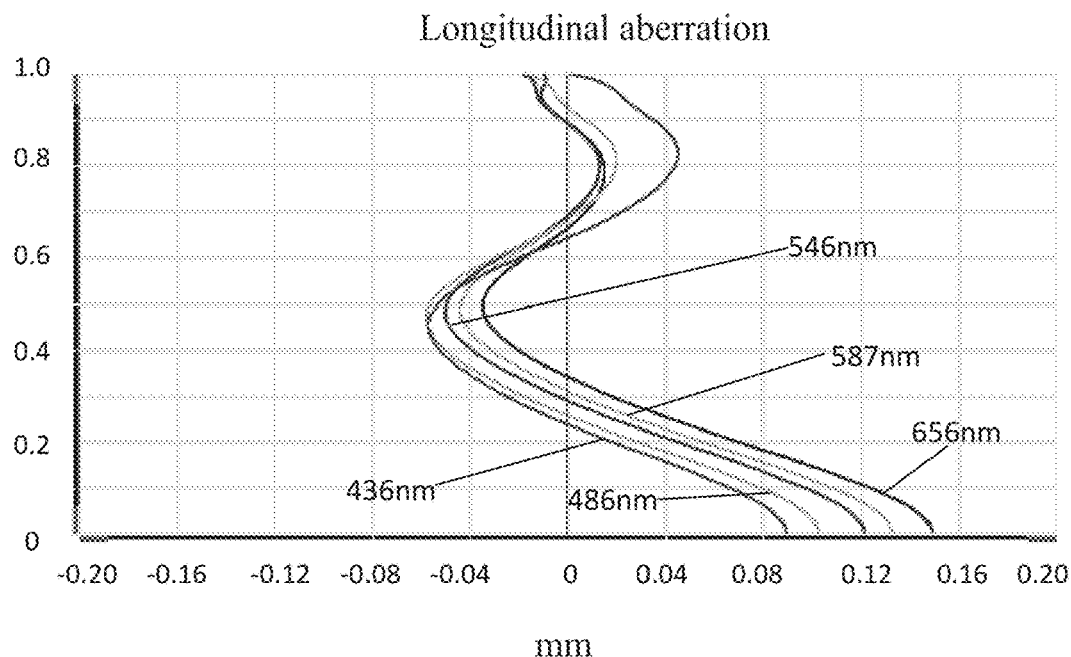
FIG. 18 is a schematic diagram of a longitudinal aberration of the camera optical lens shown in FIG. 17.
Figure 19:
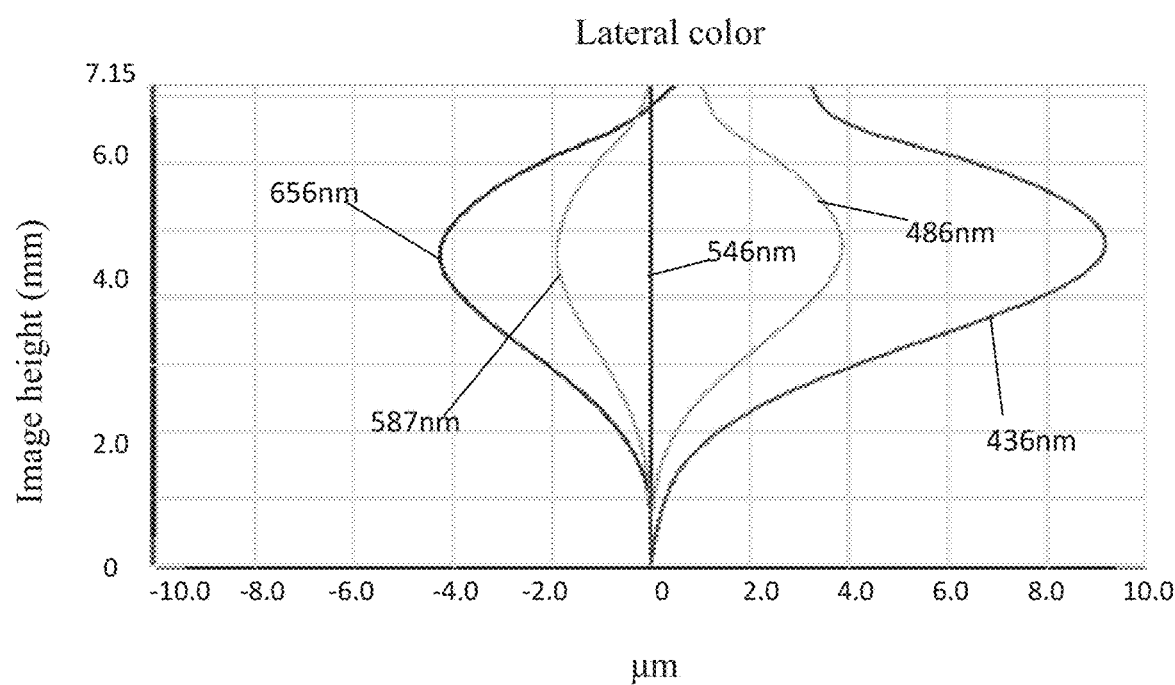
FIG. 19 is a schematic diagram of a lateral color of the camera optical lens shown in FIG. 17.
Figure 20:
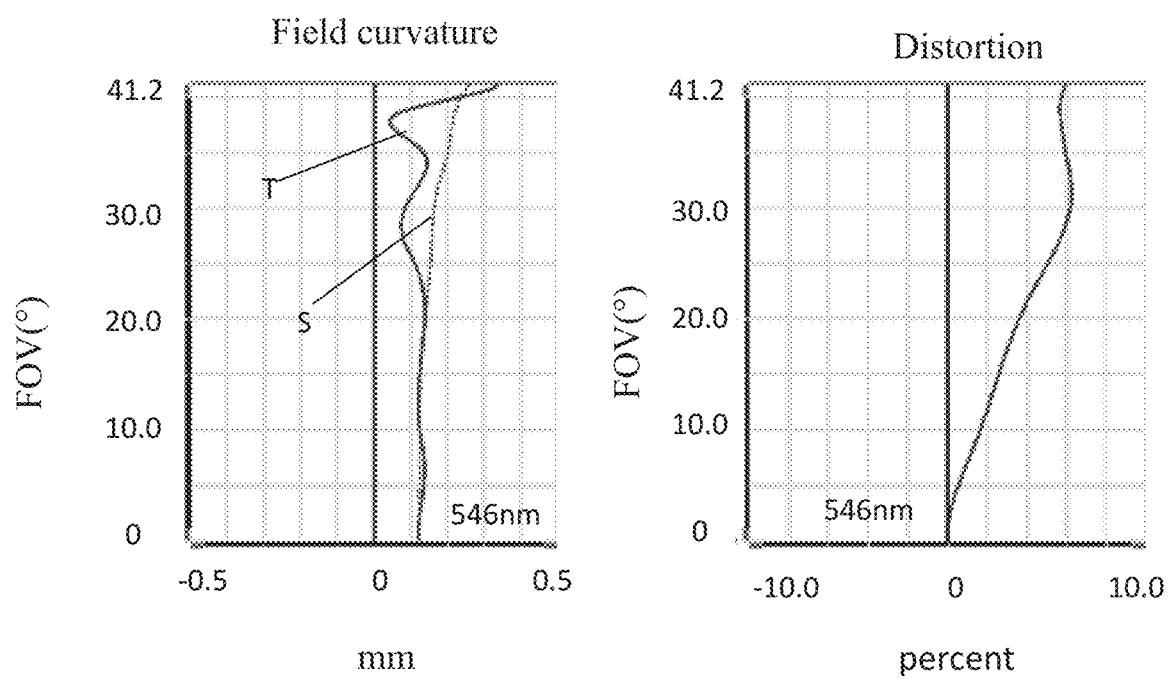
FIG. 20 is a schematic diagram of a field curvature and a distortion of the camera optical lens shown in FIG. 17.

FIG. 18 and FIG. 19 respectively illustrate a longitudinal aberration and a lateral color of light with wavelengths of 656 nm, 587 nm, 546 nm, 486 nm, and 436 nm after passing the camera optical lens 60 according to Comparative Embodiment. FIG. 20 illustrates a field curvature and a distortion of light with a wavelength of 546 nm after passing the camera optical lens 50 according to Comparative Embodiment, in which a field curvature S is a field curvature in a sagittal direction and T is a field curvature in a tangential direction.

Table 21 in the following lists values corresponding to the respective conditions. Comparative Embodiment does not satisfy the above conditions $0.85 \leq f1/f \leq 1.10$.

In the present embodiment, an entrance pupil diameter (ENPD) of the camera optical lens is 3.896 mm. An image height of 1.0 H is 7.150 mm. An FOV is 82.40°. Thus, the camera optical lens 50 does not satisfy design requirements of large aperture, ultra-thin and wide-angle.

TABLE 21

| Parameters | Embodiment 1 | Embodiment 2 | Embodiment 3 | Embodiment 4 | Comparative Embodiment |
|---|---|---|---|---|---|
| f1/f | 0.987 | 0.852 | 1.026 | 1.095 | 1.166 |
| d6/d8 | 1.780 | 1.797 | 2.989 | 1.007 | 2.984 |
| (R11 + R12)/(R11 − R12) | 14.375 | 19.997 | 3.002 | 8.918 | 14.666 |
| d15max/d15min | 2.191 | 2.062 | 2.098 | 2.173 | 2.186 |
| f | 7.599 | 7.681 | 7.636 | 7.648 | 7.877 |
| f1 | 7.504 | 6.544 | 7.838 | 8.371 | 9.187 |
| f2 | −19.611 | −15.261 | −20.508 | −20.818 | −23.683 |
| f3 | 29.575 | 44.115 | 27.400 | 27.221 | 23.628 |
| f4 | 79.625 | −8156.209 | 60.120 | 56.730 | 40.921 |
| f5 | −33.136 | 958.263 | −31.251 | −28.454 | −27.564 |
| f6 | 120.115 | 314.971 | −538.897 | 55.842 | 110.394 |
| f7 | 15.809 | 18.817 | 13.408 | 17.472 | 17.203 |
| f8 | −7.199 | −7.115 | −6.931 | −7.570 | −8.887 |
| FNO | 1.95 | 1.97 | 1.96 | 1.96 | 2.02 |
| TTL | 8.879 | 8.767 | 8.918 | 8.920 | 9.205 |
| IH | 7.150 | 7.150 | 7.150 | 7.150 | 7.15 |
| FOV | 85.20° | 85.00° | 85.20° | 85.20° | 82.40° |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera optical lens comprising, from an object side to an image side in sequence: a first lens with a positive refractive power having an object side surface being convex in a paraxial region and an image side surface being concave in the paraxial region, a second lens with a negative refractive power having an object side surface being convex in a paraxial region and an image side surface being concave in the paraxial region, a third lens with a positive refractive power having an object side surface being convex in a paraxial region and an image side surface being concave in the paraxial region, a fourth lens with a refractive power having an object side surface being concave in a paraxial region and an image side surface being convex in the paraxial region, a fifth lens with a refractive power, a sixth lens with a refractive power, a seventh lens with a positive refractive power having an object side surface being convex in a paraxial region and an image side surface being concave in the paraxial region, and an eighth lens with a negative refractive power having an object side surface being concave in a paraxial region and an image side surface being concave in the paraxial region; wherein the camera optical lens satisfies the following conditions:

$0.85 \leq f1/f \leq 1.10;$ $1.00 \leq d6/d8 \leq 3.00;$ $3.00 \leq (R11+R12)/(R11-R12) \leq 20.00;$ and $d15max/d15 min \leq 2.20;$ where, f: a focal length of the camera optical lens;
f1: a focal length of the first lens;
d6: an on-axis distance from the image side surface of the third lens to the object side surface of the fourth lens;
d8: an on-axis distance from the image side surface of the fourth lens to an object side surface of the fifth lens;
R11: a central curvature radius of an object side surface of the sixth lens;
R12: a central curvature radius of an image side surface of the sixth lens;
d15max: a maximum thickness of the eighth lens parallel to an optical axis; and
d15 min: a minimum thickness of the eighth lens parallel to the optical axis.

2. The camera optical lens according to claim 1 further satisfying the following condition: $3.00 \leq R10/R9 \leq 20.00;$
where,
R9: a central curvature radius of the object side surface of the fifth lens; and
R10: a central curvature radius of an image side surface of the fifth lens.

3. The camera optical lens according to claim 1 further satisfying the following conditions: $1.00 \leq d14/d15 \leq 2.50;$
where,
d14: an on-axis distance from the image side surface of the seventh lens to the object side surface of the eighth lens; and
d15: an on-axis thickness of the eighth lens.

4. The camera optical lens according to claim 1 further satisfying the following conditions:

$-4.14 \leq (R1+R2)/(R1-R2) \leq -1.05;$ and $0.05 \leq d1/TTL \leq 0.17;$ where,
R1: a central curvature radius of the object side surface of the first lens;
R2: a central curvature radius of the image side surface of the first lens;
d1: an on-axis thickness of the first lens; and
TTL: a total optical length from the object side surface of the first lens of the camera optical lens to an image surface of the camera optical lens along the optical axis.

5. The camera optical lens according to claim 1 further satisfying the following conditions:

$-5.44 \leq f2/f \leq -1.32;$ $1.81 \leq (R3+R4)/(R3-R4) \leq 8.00;$ and $0.01 \leq d3/TTL \leq 0.05;$ where,
f2: a focal length of the second lens;
R3: a central curvature radius of the object side surface of the second lens;
R4: a central curvature radius of the image side surface of the second lens;
d3: an on-axis thickness of the second lens; and
TTL: a total optical length from the object side surface of the first lens of the camera optical lens to an image surface of the camera optical lens along the optical axis.

6. The camera optical lens according to claim 1 further satisfying the following conditions:

$1.78 \leq f3/f \leq 8.62;$ $-9.26 \leq (R5+R6)/(R5-R6) \leq -2.10;$ and $0.02 \leq d5/TTL \leq 0.08;$ where,
f3: a focal length of the third lens;
R5: a central curvature radius of the object side surface of the third lens;
R6: a central curvature radius of the image side surface of the third lens;
d5: an on-axis thickness of the third lens; and
TTL: a total optical length from the object side surface of the first lens of the camera optical lens to an image surface of the camera optical lens along the optical axis.

7. The camera optical lens according to claim 1 further satisfying the following conditions:

$f4/f \leq 15.72;$ $-233.20 \leq (R7+R8)/(R7-R8) \leq 8.51;$ and $0.02 \leq d7/TTL \leq 0.09;$ where,
f4: a focal length of the fourth lens;
d7: an on-axis thickness of the fourth lens;
R7: a central curvature radius of the object side surface of the fourth lens;
R8: a central curvature radius of the image side surface of the fourth lens; and
TTL: a total optical length from the object side surface of the first lens of the camera optical lens to an image surface of the camera optical lens along the optical axis.

8. The camera optical lens according to claim 1 further satisfying the following conditions:

$-8.72 \leq f5/f \leq 187.14;$ and $0.02 \leq d9/TTL \leq 0.06;$ where,
f5: a focal length of the fifth lens;
d9: an on-axis thickness of the fifth lens; and
TTL: a total optical length from the object side surface of the first lens of the camera optical lens to an image surface of the camera optical lens along the optical axis.

9. The camera optical lens according to claim 1 further satisfying the following conditions:

$-141.15 \leq f6/f \leq 41.01;$ and $0.02 \leq d11/TTL \leq 0.09;$ where,
f6: a focal length of the sixth lens;
d11: an on-axis thickness of the sixth lens; and
TTL: a total optical length from the object side surface of the first lens of the camera optical lens to an image surface of the camera optical lens along the optical axis.

10. The camera optical lens according to claim 1 further satisfying the following conditions:

$$0.88 \leq f7/f \leq 3.67;$$

$$-25.59 \leq (R13+R14)/(R13-R14) \leq -3.95; \text{ and}$$

$$0.03 \leq d13/TTL \leq 0.13;$$

where,
f7: a focal length of the seventh lens;
d13: an on-axis thickness of the seventh lens;
R13: a central curvature radius of the object side surface of the seventh lens;
R14: a central curvature radius of the image side surface of the seventh lens; and
TTL: a total optical length from the object side surface of the first lens of the camera optical lens to an image surface of the camera optical lens along the optical axis.

11. The camera optical lens according to claim 1 further satisfying the following conditions:

$$-1.98 \leq f8/f \leq -0.61;$$

$$0.14 \leq (R15+R16)/(R15-R16) \leq 0.85; \text{ and}$$

$$0.04 \leq d15/TTL \leq 0.19;$$

where,
f8: a focal length of the eighth lens;
d15: an on-axis thickness of the eighth lens;
R15: a central curvature radius of the object side surface of the eighth lens;
R16: a central curvature radius of the image side surface of the eighth lens; and
TTL: a total optical length from the object side surface of the first lens of the camera optical lens to an image surface of the camera optical lens along the optical axis.

* * * * *